(12) United States Patent
Goto

(10) Patent No.: US 6,392,613 B1
(45) Date of Patent: May 21, 2002

(54) PORTABLE ELECTRONIC DEVICE

(75) Inventor: Teiyu Goto, Saitama (JP)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

(21) Appl. No.: 09/249,746

(22) Filed: Feb. 12, 1999

(30) Foreign Application Priority Data

Feb. 25, 1998 (JP) .............................. 10-044112

(51) Int. Cl.[7] ................................. G06F 1/16
(52) U.S. Cl. ..................... 345/30; 345/905; 361/683; 463/1; 463/44; 463/45
(58) Field of Search .................. 345/30, 126, 905; 365/683; 463/1, 44, 45

(56) References Cited

U.S. PATENT DOCUMENTS

| | | | |
|---|---|---|---|
| 5,428,528 A | | 6/1995 | Takenouchi et al. |
| 5,566,098 A | * | 10/1996 | Lucente et al. |
| 5,661,632 A | * | 8/1997 | Register |
| 5,719,744 A | * | 2/1998 | Jenkins et al. .............. 361/683 |
| 5,743,801 A | * | 4/1998 | Welander .................... 463/44 |
| 5,757,354 A | * | 5/1998 | Kawamura |
| 5,867,795 A | * | 2/1999 | Novis et al. ................. 455/566 |
| 5,895,906 A | * | 4/1999 | Danielson et al. ..... 235/462.27 |
| 5,913,310 A | * | 6/1999 | Brown ........................ 128/897 |
| 5,973,915 A | * | 10/1999 | Evans ......................... 361/681 |
| 6,022,274 A | * | 2/2000 | Takeda et al. ................ 463/44 |
| 6,037,954 A | * | 3/2000 | McMahon ................... 345/901 |

FOREIGN PATENT DOCUMENTS

| | | | |
|---|---|---|---|
| EP | 827 061 A | * | 3/1998 |
| WO | 94/19736 | * | 9/1994 |
| WO | WO 94/19736 | | 9/1994 |

* cited by examiner

*Primary Examiner*—Bipin Shalwala
*Assistant Examiner*—Vincent E. Kovalick
(74) *Attorney, Agent, or Firm*—Frommer Lawrence & Haug LLP; William S. Frommer; Gordon Kessler

(57) ABSTRACT

A portable electric device adapted to be removably connected to an external device comprises a housing having an access opening. A display is positioned within the housing for displaying display information thereon. An electrical circuit is accommodated in the housing and has a terminal accessible via the access opening in the housing. The electrical circuit determines a display orientation of the display of information on the display based upon a state in which the portable electrical device is connected to the external device.

12 Claims, 31 Drawing Sheets

PORTABLE ELECTRONIC DEVICE

BACKGROUND OF THE INVENTION

This invention relates generally to a portable electronic device used as an auxiliary storage device for an information equipment, such as a memory card device, and also to a portable, electronic gaming device, and more particularly to a portable electronic apparatus having a display portion thereof As is known in the art, a portable electronic device or a slave device, such as a memory card device, may be used as a non-volatile storage element for holding data. The portable electronic device is inserted into an information providing apparatus, such as a video game machine acting as a master device, and receives information thereof for storage. The portable electronic device includes an interface for connection to a main body portion of the information providing apparatus.

FIG. 34A shows an illustrative block diagram structure of a memory card device as an example of the portable electronic device. In FIG. 34A, a memory card device 10 has a control circuit 11 for controlling the operation of the memory card device, a connector 12 for connecting the memory card device to a terminal provided in a slot of the main body portion of the information providing apparatus and a non-volatile memory 16 for holding data. Connector 12 and non-volatile memory 16 are coupled with control circuit 11. The control circuit comprises, by way of example, a micro-computer and the non-volatile memory comprises a flash memory, such as EEPROM, or the like by way of example. As a connection interface with the information providing apparatus, an additional micro-computer, or the same micro-computer as that used for controller 12, may be used to oversee the data transfer protocol.

FIG. 34B further shows a plurality of control items within controller 11 of memory card device 10. Here, the controller 11 has a connection interface 11A for connection to the main body portion of the information providing apparatus and a memory interface 11B for data input/output for non-volatile memory 16.

A conventional video game device, such as a home TV game device, stores game data or the like in an auxiliary storage device. The above-mentioned memory card device 10 may be used as this auxiliary storage device for such a conventional video game device. FIG. 35 depicts an example of such a conventional video game device 1 employing memory card device 10 as the auxiliary storage device. As shown, the video game device has a main body portion 2 housed in a casing. A disc loading unit 3 is positioned in a center area thereof and is adapted to receive an optical disc having an application program recorded thereon to be used by the video game device. Main body portion 2 of video game device 1 includes a reset switch 4 for optionally resetting the game, a power switch 5, a disc actuating switch 6 for actuating the loading of the optical disc, and in a preferred embodiment by way of example, two slots 7A and 7B. Memory card device 10, used as the auxiliary storage device, is inserted into one of slots 7A and 7B. A control circuit 19 (Central Processing Unit "CPU") of video game device 1 feeds information indicative of, for example, the results of a game being executed on the video game device. These game results are written to nonvolatile memory 16 of memory card device 10 and may include score results, game position information so a user may restart a game at a desired location, or the like. Plural actuators (controllers), not shown, may also be connected to slots 7A and 7B so that plural users can simultaneously play combat games or the like, for example.

The portable electronic device may be connected to the external device during use in any number of orientations. The portable electronic device may be mounted on an upper end, a lower end or a lateral surface of the external device, in any variety of use states. If a display unit is provided on the portable electronic device, the display unit of the device is designed to be viewed from a particular direction when the apparatus is attached in a particular mounting state. When the portable electronic device is attached to the upper end of an external device, for example, and is thus connected in this proper mounting state and position, display on the display unit is normal and may be easily viewed by a user.

However, when the portable electronic device is mounted on a different external device, it may be mounted in a different position and orientation, such as on an upper end or on a lateral surface of the external device, by way of example. In this case, the display on the display unit is not visible in a normally oriented state, but in an upside-down state, so that it is difficult to view.

Therefore, it would be beneficial to provide an improved portable electronic apparatus having a display that overcomes the drawbacks of the prior art.

OBJECTS OF THE INVENTION

It is therefore an object of the invention to provide an improved portable electronic apparatus with a display.

It is another object of the invention to provide an improved portable electronic apparatus that when mounted on an external equipment during use, a display thereof may be optimally viewed regardless of the orientation of the portable electronic apparatus mounted on the external equipment.

Still other objects and advantages will in part be obvious and will in part be apparent from the specification and the drawings.

SUMMARY OF THE INVENTION

Generally speaking, in accordance with the invention, a portable electronic device including an outer casing holding an electronic circuit portion that can be connected to an external equipment is provided. The portable electronic device includes a display provided in an outer casing thereof, the display being controlled by an electronic circuit portion of the portable electronic device. An opening provided in the outer casing of the portable electronic device for housing a terminal portion thereof, and adapted to be connected to a piece of external equipment is provided for determining the orientation of the display when the portable electronic device is connected to an external equipment. The electronic circuit portion is responsive to the results of the determination of the orientation of the display, and thus determines the direction in which material is shown on the display.

Therefore, in accordance with the portable electronic device of the invention, optimum orientation of material presented on the display thereof can be realized, irrespective of the mounting orientation of the portable electronic device on the external equipment.

The invention accordingly comprises the several steps and the relation of one or more of such steps with respect to each of the others, and the apparatus embodying features of construction, combinations of elements, and arrangement of parts which are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
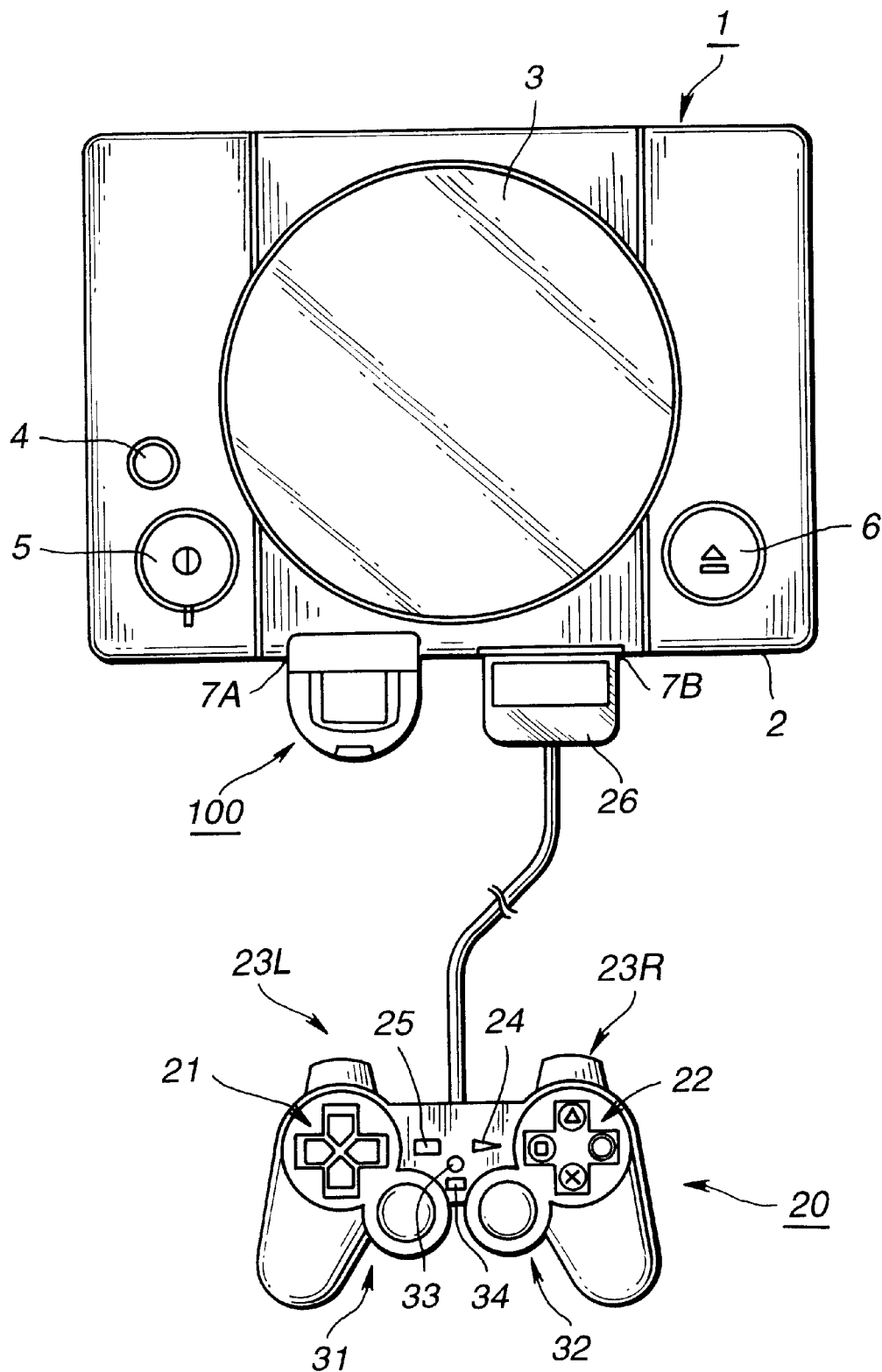
FIG. 1 is a top plan view depicting a video game device connected with a portable electronic apparatus constructed in accordance with the present invention.

Referring to the drawings, the preferred embodiments of the present invention will be explained in detail. It should be noted that the portable electronic device of the present invention is usable not only as a memory card for an entertainment system, such as a video game device that acts as a master device, but also as a portable small-sized game device. The master device is not limited to a video game device, while the portable electronic apparatus, acting as a slave device, need not necessarily be limited to a memory card.

In the following description, a video game device is depicted as an example of a master device, in which a portable electronic device embodying the present invention is used as a slave device.

Referring first to FIG. 1, a video game device 1, acting as a master device, is shown with a portable electronic device 100 constructed in accordance with the present invention loaded thereon. Video game device 1 is provided with a main body portion 2 housed in a casing, and a disc loading unit 3 adapted for loading an optical disc is positioned in a center area thereof. This optical disc may comprise a CD-ROM as a recording medium, the optical disc having an application program recorded thereon to be executed by video game device 1. The video game device reads out the game program recorded on the optical disc, and executes the game program in accordance with instructions from a user (game player). Game execution includes controlling the progress of the game, display and sound. Main body portion 2 of video game device 1 also includes in a preferred embodiment, a reset switch 4 for optionally resetting the game, a power switch 5, a disc actuating switch 6 for loading the optical disc, and two slots 7A and 7B. The recording medium for supplying the application program is not limited to an optical disc; and the application program may also be supplied via a communication network or via other non-volatile storage media.

Two actuating devices 20 may each be selectively connected to either one of slots 7A and 7B so that two users can play a combat or other two player, or head-to-head game. The aforementioned memory card device or the portable electronic device embodying the present invention can also be inserted in either of slots 7A and 7B. Although FIG. 1 shows two slots 7A and 7B, the number of slots may also be other than two.

Actuating device 20 includes first and second actuating units 21 and 22, an L-button 23L, an R-button 23R, a start button 24, and a selection button 25. Actuating device 20 also includes actuating units 31 and 32, a mode selection switch 33 for selecting between the operating modes of these actuating units and 21 and 22, and 31 and 32, and a display unit 34 for displaying the selected actuating mode.

Figure 2:
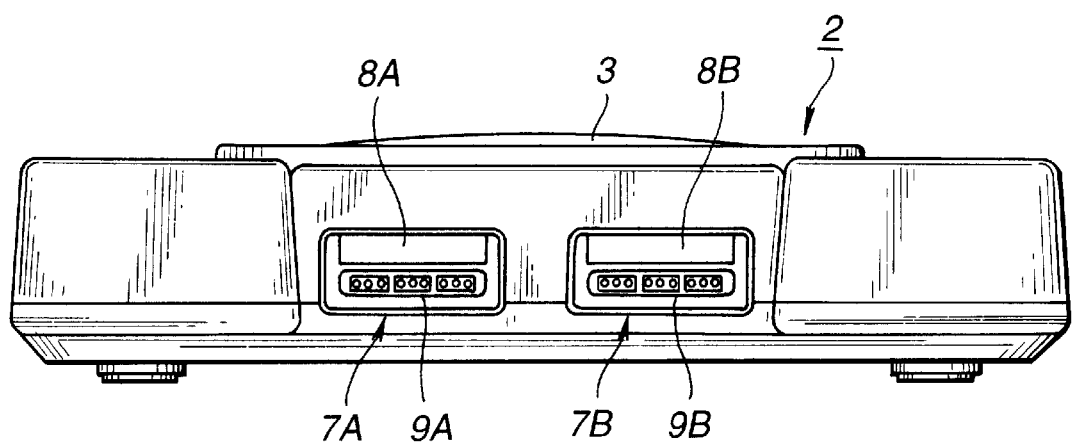
FIG. 2 is a front elevational side view of a slot portion of the video game device of FIG. 1.

FIG. 2 depicts the appearance of slots 7A and 7B provided on the front surface of main body portion 2 of video game device 1. In the present embodiment, slots 7A and 7B are designed having two tiers. In the upper tier of each slot is provided a memory card insertion unit 8A and 8B, respectively, in which a memory card device or portable electronic device may be selectively inserted as later explained. In the lower tier of each slot 7A or 7B is provided a controller connection unit (jacks) 9A or 9B, respectively, for connecting a connection terminal (connector) 26 of each controller 20 to the video game device.

The insertion slots of memory card insertion units 8A and 8B are formed as horizontally elongated rectangles whose upper side corners are rounded more prominently than the lower side corners thereof (not shown) to prevent the memory card or portable electronic device from being inserted in an incorrect orientation. Memory card insertion units 8A and 8B are also provided with a shutter for protecting a connection terminal provided therein (not shown). Controller connection units 9A and 9B are formed of horizontally elongated rectangles whose lower side corners are rounded more prominently than the upper side corners thereof to prevent connection terminal 26 of controller 20 from being inserted in an incorrect orientation. Additionally, the insertion slots of controller connection units 9A and 9B are of a different shape from memory card insertion units 8A and 8B to prevent incorrect insertion of the memory card in controller connection units 9A and 9B, and vice-versa.

Figure 3:
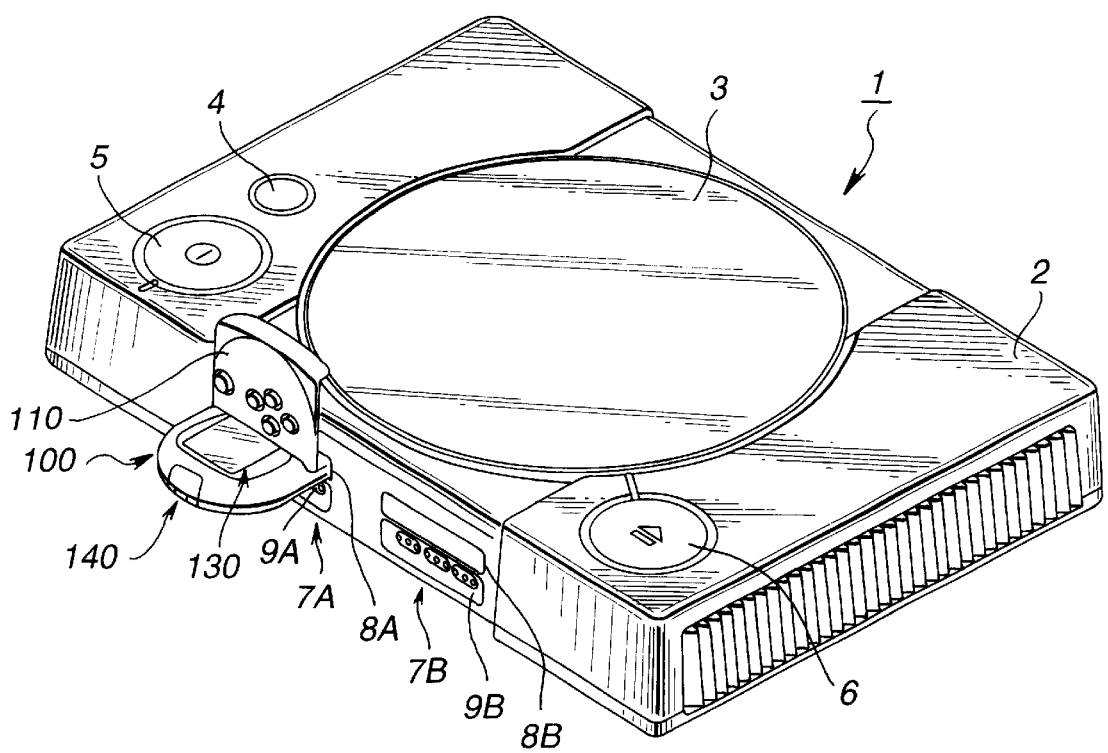
FIG. 3 is a perspective view depicting the video game device of FIG. 1 with the portable electronic apparatus constructed in accordance with the invention coupled therewith.

Referring next to FIG. 3, portable electronic device 100 of the present invention is shown having been inserted into memory card insertion unit 8A of slot 7A on the front side of video game device 1. A lid 110 of portable electronic device 100 is in an opened position, allowing for the insertion of the portable electronic device.

Figure 4:
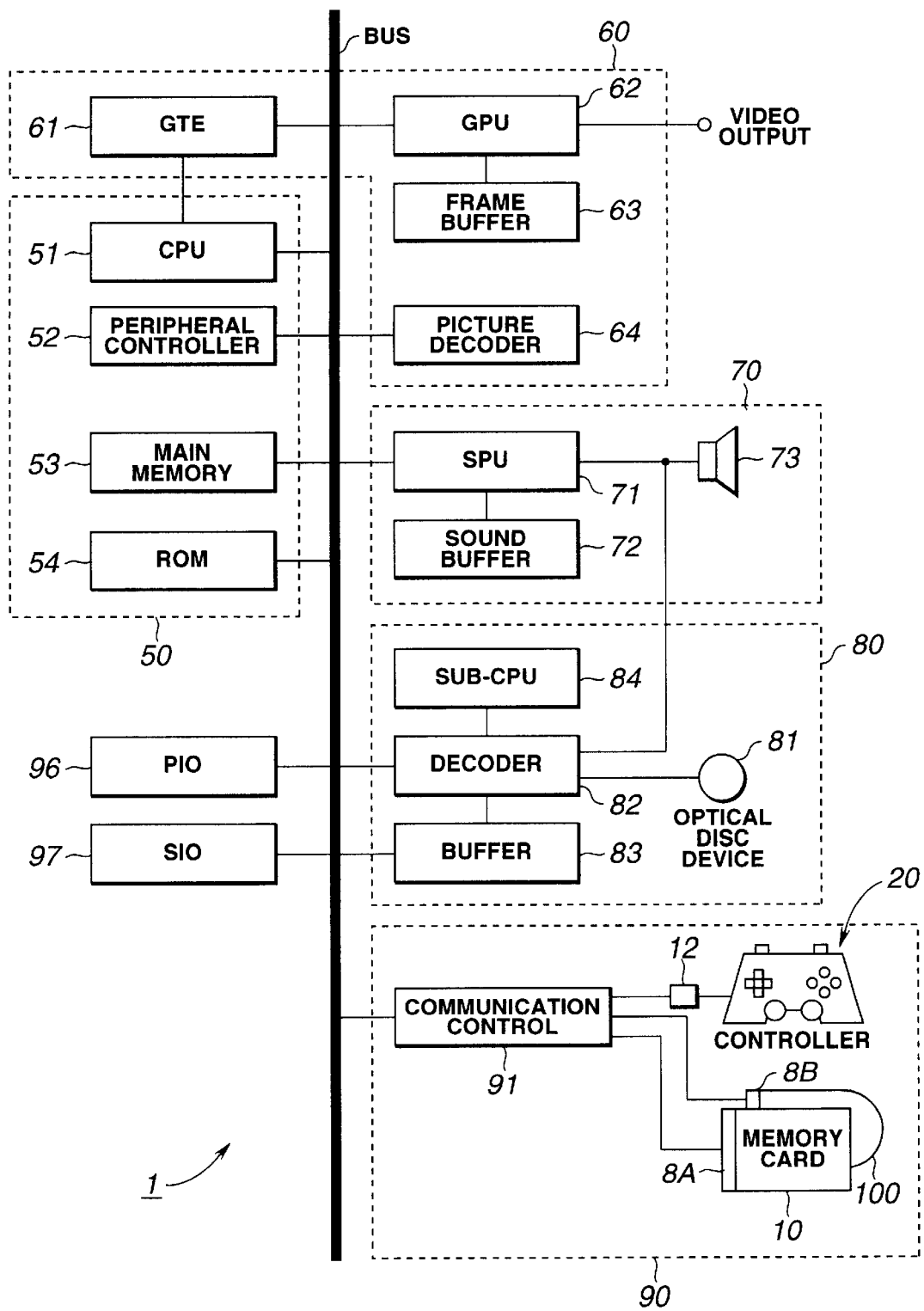
FIG. 4 is a block diagram showing an illustrative structure of essential portions of the video game device of FIG. 1.

FIG. 4 is a block diagram showing an example of a schematic circuit configuration of essential portions of video game device 1. The video game device includes a control system 50 made up in part of a central processing unit CPU 51 and peripherals, a graphic system 60 comprised in part of a graphic processing unit GPU 62 for performing a drawing operation to a frame buffer 63 and peripherals, a sound system 70 comprised in part of a sound processing unit SPU for generating music, other sound effects, an optical disc controller 80 for controlling an optical disc having an application program recorded thereon, and a communication unit 90 comprising in part a communication controller 91 for controlling input/output of data from the portable electronic device 100 or memory card 10 for storing game setting data and signals received from controller 20, in accordance with commands from the user and game setting signals, and a bus BUS for interconnecting the above components.

Control system 50 includes CPU 51, a peripheral controller 52 for controlling interrupt or direct memory access (DMA) transfer, a main memory 53 comprised of a random access memory (RAM) and a read-only memory (ROM) having stored therein programs for operating main memory 53, graphic system 60 or sound system 70. CPU 51 executes instructions in accordance with an operating system stored in memory in a ROM 54 in order to control video game device 1 in its entirety. ROM 54 is comprised of, for example, a 32-bit RISC-CPU.

On power up of video game device 1, CPU 51 of control system 50 executes instructions in accordance with the operating system stored in ROM 54 so that CPU 51 controls graphic system 60 and/or sound system 70. When the operating system is executed, CPU 51 initializes video game device 1 in its entirety, such as operation recognition, and subsequently controls optical disc controller 80 to execute the application program such as the game recorded on the optical disc. During execution of the recorded game program, CPU 51 is responsive to the input from the user via controller 20 to control graphic system 60 to present the appropriate picture display and sound system 70 regarding generation of the proper sound effects.

Graphic system 60 includes a geometry transfer engine (GTE) 61 coupled with CPU 51 for performing processing, such as coordinate transformation. GPU 62 draws a picture in accordance with drawing commands from CPU 51, a frame buffer 63 stores a picture drawn by GPU 62 and a picture decoder 64 decodes picture data that was compressed when encoded by orthogonal transform such as DCT or the like.

GTE 61 includes a parallel computing mechanism and is responsive to a request for processing from CPU 51 to execute high-speed processing such as coordinate transformation, light source computations, matrix or vector computations. In a preferred embodiment GTE 61 executes coordinate computations of up to 1,500,000 polygons per second including flat shading or drawing a sole triangular polygon with the same color. It is thus possible to reduce the computational burden on CPU 51 and to execute high-speed coordinate computations through the use of GTE 61.

GPU 62 is also responsive to a drawing command from CPU 51, and is adapted to draw a picture such as a polygon on frame buffer 63. GPU 62 can draw up to 360,000 polygons per second. Frame buffer 63 is comprised of a dual-port RAM and can receive a picture from GPU 62, transfer a picture from a main memory and read out a picture for display simultaneously. In a preferred embodiment, frame buffer 63 is formed with a capacity of, for example, 1 Mbyte and is handled as a matrix of 1024 horizontal pixels and 512 vertical pixels, each pixel being 16 bits. Frame buffer 63 may further include, in addition to a display area for storing a video display to be output, a CLUT (color look-up table) area in which to store a CLUT to which the GPU 62 refers when drawing a picture such as a polygon. The frame buffer may additionally include a texture area in which is stored a texture that may be inserted (mapped) into e.g., a polygon coordinate-transformed and drawn by the GPU 62. The size of the CLUT area and the texture area are dynamically changed in response to changes in the display area.

GPU 62 can perform goulow shading, i.e. determining the color in a polygon by complementation from the color of the vertex point and texture mapping of affixing the texture stored in the texture area to the polygon, in addition to the above-mentioned flat shading. In carrying out the goulow shading or texture mapping, in a preferred embodiment, GTE 61 can execute coordinate computations of up to about 500,000 polygons per second. Picture decoder 64 decodes picture data of still or moving pictures stored in main memory 53 under the control of CPU 51, and stores the resulting decoded picture data in the main memory. Also, the reproduced picture data is stored via GPU 62 in frame buffer 63 so as to be usable as the picture drawn by the GPU 62.

Sound system 70 also includes SPU 71 for producing the musical sound or the sound effect in accordance with instructions from CPU 51, a sound buffer 72 that stores wave data or the like provided by SPU 71, and a speaker 73 for outputting the musical sound or the sound effect generated by SPU 71. SPU 71 performs an adaptive differential PCM (ADPCM) decoding function for reproducing sound data obtained on adaptive differential PCM (ADPCM) of, for example, 16-bit sound data as a 4-bit differential signal. SPU 71 further performs a reproducing function of reproducing the waveform data stored in sound buffer 72 to generate the sound effect and a modulation function of modulating and reproducing the waveform data stored in sound buffer 72. Sound system 70 can function as a sampling sound source for generating a musical sound or sound effect based on the waveform data recorded in sound buffer 72 in accordance with the instructions from CPU 51.

Optical disc controller 80 includes an optical disc device 81 for reproducing the program or data recorded on an optical disc, a decoder 82 for decoding the program or data having an error correction code (ECC) appended thereto, and a buffer 83 for temporarily storing data reproduced from optical disc device 81 to expedite data readout from the optical disc. A sub-CPU 84 is coupled to decoder 82. Sound data recorded on an optical disc and read out by optical disc device 81 may be recorded using PCM data obtained by analog/digital conversion of various sound signals in addition to the above-mentioned ADPCM data. A sound data portion of the ADPCM data, corresponding to the difference of 16-bit digital data represented as 4-bits and recorded in this form, is decoded by decoder 82 and supplied to SPU 71. There, the data is processed by the SPU 71 such as by digital/analog conversion and then forwarded for driving speaker 73.

Communication controller 90 includes a communication control unit 91 for controlling communication with CPU 51 via bus BUS. Communication control unit 91 provides controller connection units 9A and 9B connected to controller 20 for entering a user command, and memory card insertion units 8A and 8B, for receiving memory card 10 and portable electronic device 100, constructed in accordance with the invention.

Controller 20 connected to controller connection units 9A and 9B has, by way of example, 16 command keys, to allow entry of commands by a user, and is thus responsive to commands from communication control unit 91. Controller 20 sends the status of the command keys approximately sixty times per second, for example in a preferred embodiment, to communication control unit 91 by synchronous communication. Communication control unit 91 sends the status of the command keys of controller 20 to CPU 51. The commands input by the user to CPU 51 cause CPU 51 to perform processing in accordance with the received user command based upon a game program currently being processed.

During the processing of a game program, a large quantity of picture data must be transferred between main memory 53, GPU 62, picture decoder 64 and decoder 82. Thus, the present video game device is designed so that data can be directly transferred among main memory 53, GPU 62, picture decoder 64 and decoder 82 under control of peripheral controller 52, without the interposition of CPU 51, by way of so-called DMA transfer. By using such DMA transfer, it is possible to relieve the computational burden on CPU 51 and enable high-speed transfer of data. If it is necessary to store in memory (of the portable electronic device or memory card) the current state data of a game currently being processed, CPU 51 transmits the data to be stored to communication control unit 91, which in turn writes the data from CPU 51 into memory card 10 or into portable electronic device 100, whichever is inserted into one of the memory card insertion units 8A or 8B.

Communication control unit 91 further includes a protective circuit for preventing electrical destruction of video game device 1, memory card 10 or portable electronic device 100. Memory card 10 or portable electronic device 100 may be mounted or dismounted while the main body portion of video game device 1 is powered up. If the recording capacity of memory card 10 or portable electronic device 100 is reaching its limit, this used memory card or portable electronic device can be removed, and a new memory card or portable electronic device can be inserted into video game device without turning off the power of the video game device. Thus, there is no risk of inadvertent loss of game data when backing-up, or when inserting a new memory card or portable electronic device. A parallel I/O interface (PIO) 96 and a serial I/O interface (SIO) 97 act as interfaces for interconnecting memory card 10, portable electronic device 100, or other additional equipment and video game device 1.

A portable electronic device embodying the present invention is hereinafter explained. In the following description, as is shown in FIG. 3, it is presupposed that portable electronic device 100 is loaded on video game device 1, and is to be controlled thereby. A portable electronic device, acting as slave device, is loaded into memory card insertion unit 8A or 8B provided in the slots 7A or 7B, respectively, of video game device 1, acting as a master device. Portable electronic device 100 is used as a memory card associated with the plural actuating devices. If, for example, the game is played by two users (players), the results of the game by the two players are recorded in two portable electronic devices 100. This function is also provided in a conventional apparatus by recording on a simple memory card 10.

Upon insertion of memory card 10 or portable electronic device 100 in memory card insertion unit 8A or 8B, the conductors of the connection terminals for grounding and for providing power to the memory card or portable electronic device are longer than the other data transmission terminals. Thus, the power source terminals and the ground terminals preferably are electrically connected first. This assures safety and stability of the electrical operations. Alternatively, or additionally, the connection terminals for grounding and for providing power of memory card insertion unit 8 of video game device 1 may also be longer in length than the other data transmission terminals. Also, the connector portions of the memory card or portable electronic device and memory card insertion unit 8A and 8B are configured asymmetrically in the left-and-right direction to further guard against improper insertion of memory card 10 or portable electronic device 100.

Figure 5:
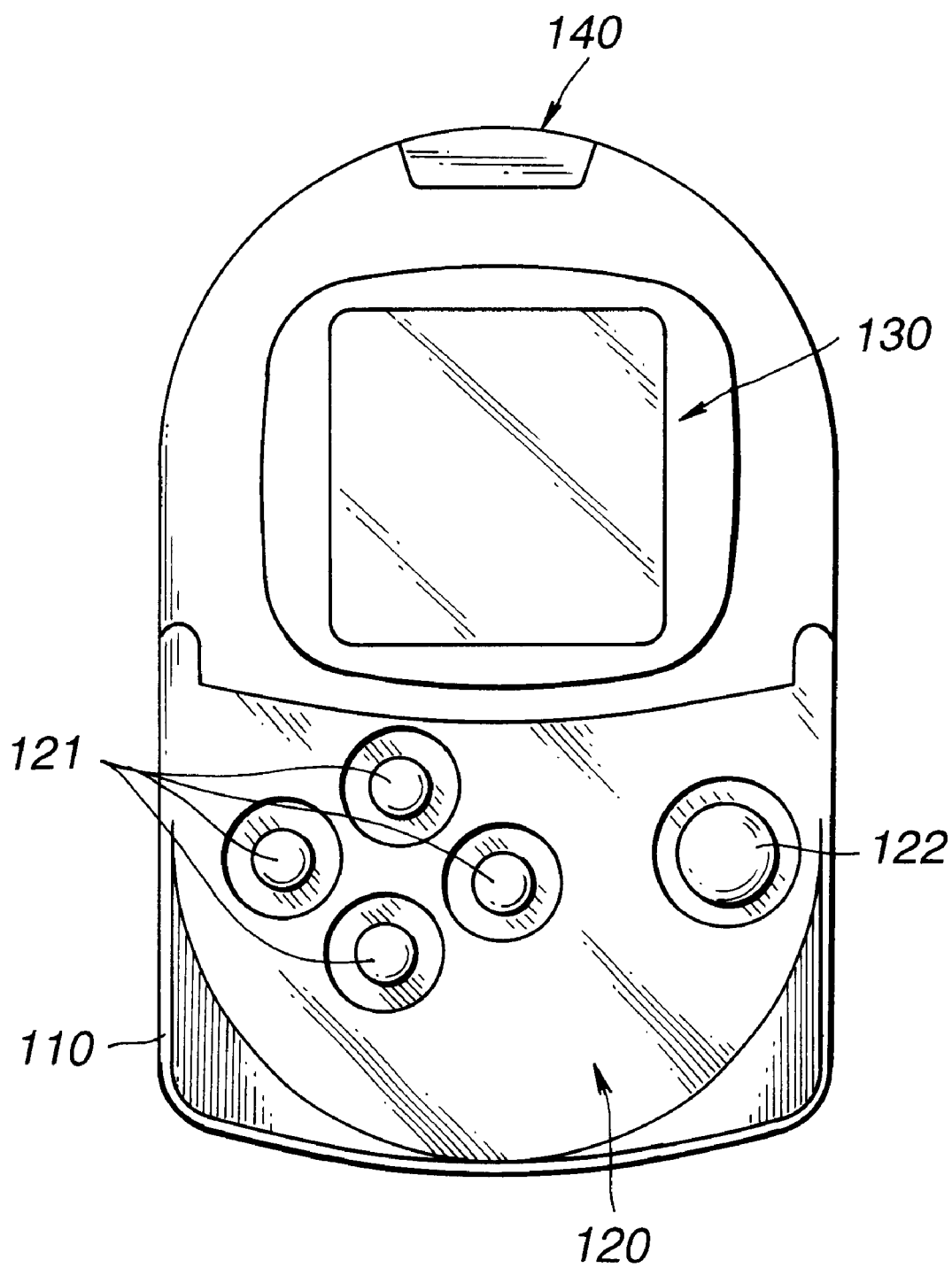
FIG. 5 is a front elevational view depicting the portable electronic apparatus constructed in accordance with a first embodiment of the invention.
Figure 6:
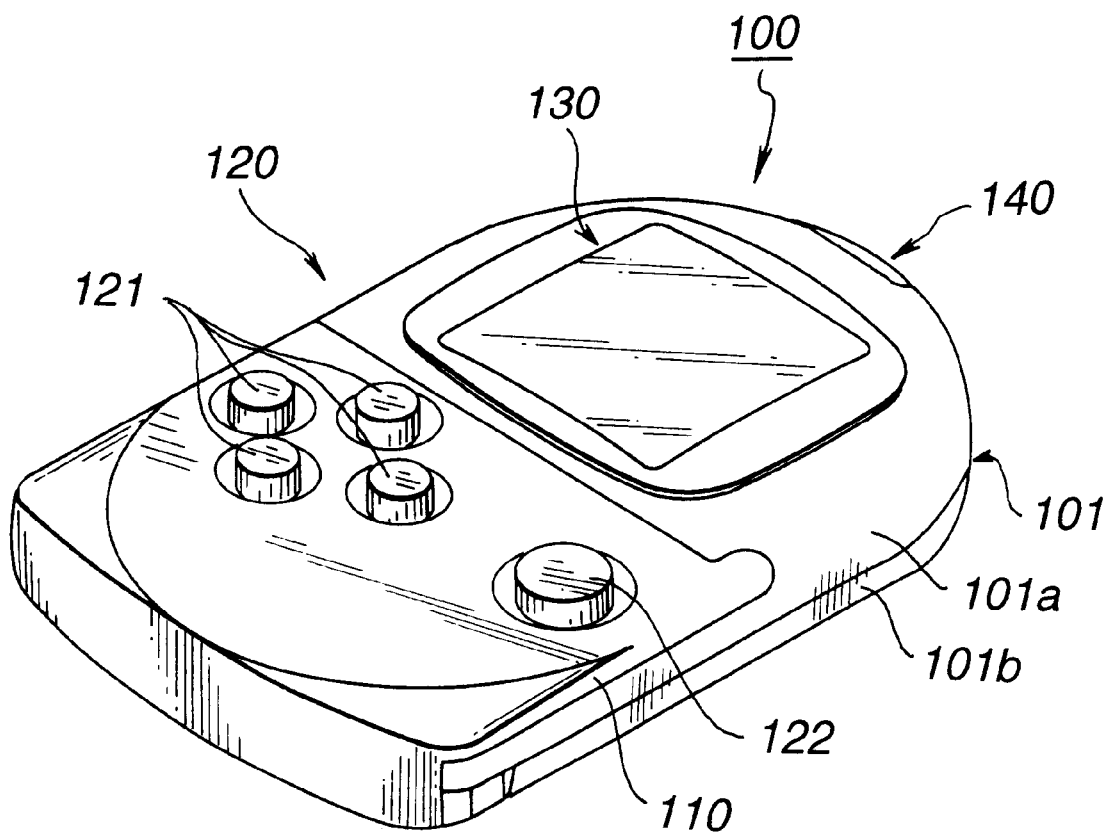
FIG. 6 is a perspective view of the portable electronic apparatus of FIG. 5.
Figure 7:
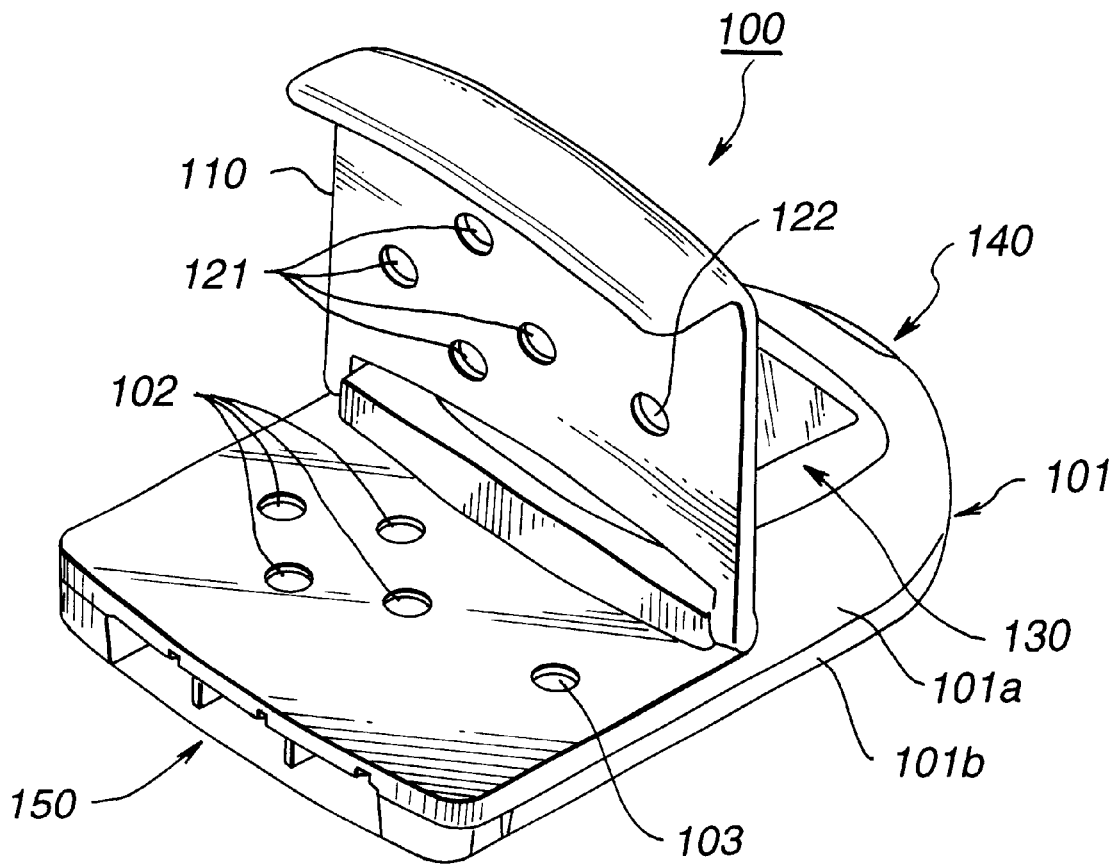
FIG. 7 is a perspective view showing the portable electronic apparatus of FIG. 5 with a lid thereof positioned in an open state.
Figure 8:
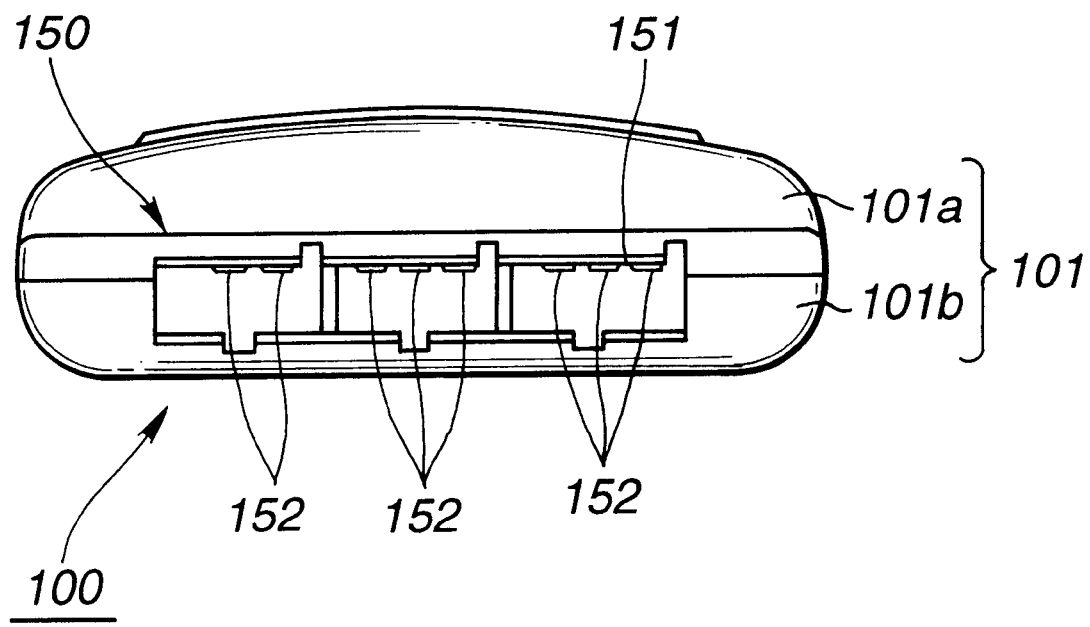
FIG. 8 is a bottom plan view of the portable electronic apparatus of FIG. 5.

FIGS. 5 to 8 are views of portable electronic device 100 constructed in accordance with a first, preferred embodiment of the invention. Specifically, FIG. 5 is a front side elevational view of the portable electronic device, FIG. 6 is a perspective view showing a cover member 110 in a closed state for protection of the connector portion of the portable electronic device, FIG. 7 is a perspective view showing cover member 100 in an open state, and FIG. 8 is a bottom plan view of the portable electronic device.

Referring to FIGS. 5 to 8, portable electronic device 100 includes a housing 101 as an outer enclosure, an actuation unit 120 having one or more actuator buttons 121, 122 for inputting information or making a selection by a user, a display unit 130, made up of liquid crystal devices (LCDs), and a window 140 for wireless communication, such as by IR communication.

Housing 101 is made up of an upper shell 101a and a lower shell 101b and holds a substrate 151 on which are mounted memory devices or the like. Housing 101 is dimensioned to be inserted into slots 7A or 7B of the main body portion of video game device 1 and includes a connector 150 formed with a rectangular window on one end thereof for insertion into the video game device.

Window 140 is provided on an opposite end portion of housing 101 from connector 150 and is provided with a generally hemispherical shape. Display unit 130 is provided in the vicinity of the window 140 on an upper surface of housing 101, occupying approximately one half of the area of the upper surface of housing. Actuator 120 is also provided on the upper surface of the housing 101, is dimensioned to occupy substantially the remaining half of the area of the upper surface, and is positioned in the vicinity of connector 150. Actuator 120 is located within lid member 110, which is rotatably supported relative to housing 101. Lid member 110 has one or more actuator buttons 121, 122 formed therein. Switch elements 102, 103 are provided below lid member 110 on the housing 101 at positions corresponding to and in registration with actuator buttons 121, 122, respectively. The actuator buttons are arranged to traverse the lid member and are supported by the lid member so as to be movable in a direction emerging from and receding below the upper surface of the lid member, allowing a force to be translated therethrough.

Switch elements 102, 103 are supported on housing 101, and are positioned to translate a force received thereby, to a respective diaphragm switch associated therewith, provided on substrate 151 in housing 101. When lid member 110 is closed, if a force is applied to actuator buttons 121, 122 from above so as to force actuator buttons 121, 122 below the upper surface of lid member 110, the actuator buttons translate this force to the associated diaphragm switch on substrate 151 in the housing via associated switch elements 102, 103. It is noted that a flexible protective sheet can be bonded to the switch elements 102, 103 so that a force may be applied directly thereto by a hand or finger from above the protective sheet without the interposition of the actuators 121, 122, while contaminants such as dust and dirt are prevented from entering the inside of housing 101.

As is further shown in FIG. 8, a plurality of terminals 152 are provided within the window of connector 150 and are arranged on substrate 151. Terminals 152 supply power to, and provide for data transfer between portable electronic device 100 and video game device 1. The shape and size of connector 150 is the same as that of memory card 10 conventionally used with the video game device.

Figure 9B:
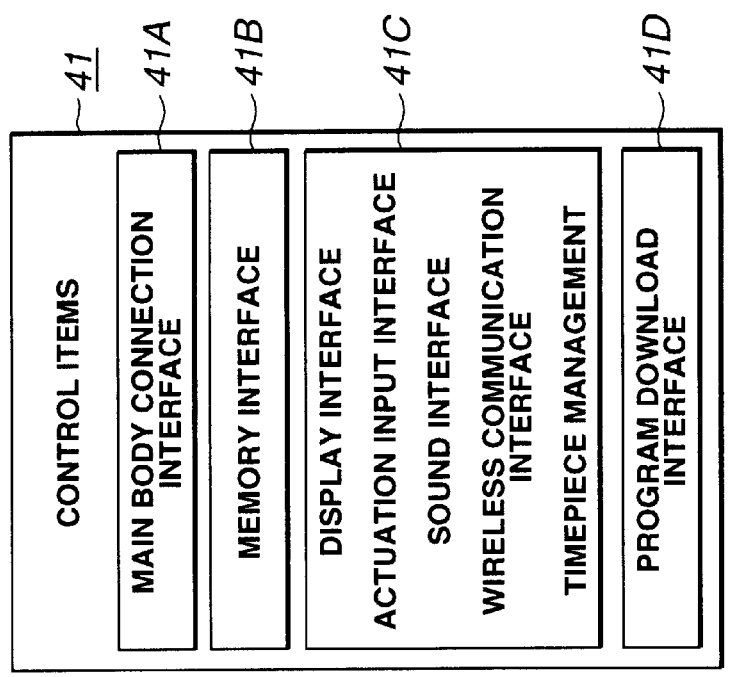
FIG. 9B is a block diagram showing an illustrative structure of the microcomputer controller of FIG. 9A.
Figure 9A:
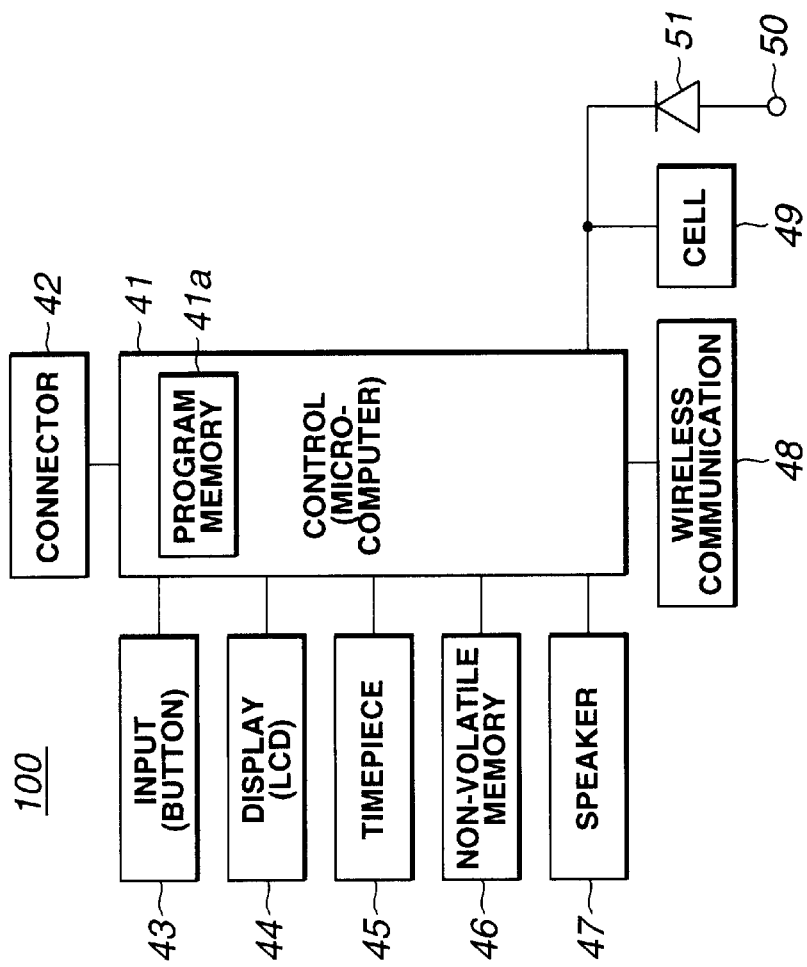
FIG. 9A is a block diagram showing an illustrative structure of essential portions of the portable electronic apparatus of FIG. 5.

FIG. 9A is a block diagram showing an illustrative structure of portable electronic device 100. Similar to the conventional memory card, the portable electronic device includes a control unit 41 for controlling the operation thereof, a connector 42 for connection to video game apparatus 1 and a non-volatile memory 46 for storing data.

Control unit 41 comprises a micro-computer and has a program memory 41a therein for storing a program. Non-volatile memory 46 preferably is a semiconductor memory device, such as a flash memory. The portable electronic device is provided with an electric battery, or other charge-storing cell 49. Thus, a static random access memory (SRAM) capable of fast data input/output, may be provided as non-volatile memory 46.

Portable electronic device 100 differs from conventional memory card 10 in that it includes an actuation unit 43 corresponding to actuator buttons 121, 122 for actuating and processing a stored program. Portable electronic device 100 further includes a display unit 44, such as a liquid crystal display device (LCD) for displaying a variety of information items responsive to the program being processed, a wireless communication unit 48 for exchanging data with another portable electronic device via infrared (IR) communication, by way of example. The portable electronic device can be operated under the power of battery 49 by itself when the device is removed from slots 7A and 7B of video game device 1. A rechargeable secondary cell may also be provided in place of battery 49. When portable electronic device 100 is inserted into slots 7A or 7B of video game device 1, power is supplied from video game device to the portable electronic device through a power source terminal 50 from the video game device via a reverse flow inhibiting diode 51 connected to a terminal of battery 49. The portable electronic device also includes a timepiece 45, and a speaker 47 for outputting audio sound in accordance with the program being executed. Each of the components of portable electronic device 100 is connected to control unit 41 and has its operation controlled thereby.

FIG. 9B shows internal elements included in control unit 41. While a conventional memory card includes only a connection interface 41A for connection to the main body portion of a video game device and a memory interface 41B for control of the input/output of data to the memory, portable electronic device 100 includes those interfaces and additionally includes a display interface, an actuation input interface, a sound interface, a wireless communication interface, a timepiece management interface 41C and a program downloading interface 41D. The interfaces (drivers) for managing the additional functions of portable electronic device 100 in the present embodiment are controlled by control unit 41 (micro-computer), independently of the main body connection interface and the memory interface and, therefore, interchangeability between conventional memory card 10 and the portable electronic device 100 may be maintained. Since the portable electronic device is formed with an input actuator unit 43 and a display unit 44, the portable electronic device can be used as a portable game playing machine by running game application software when disengaged from video game device 1. Moreover, since portable electronic device 100 may store in program memory 41a an application program downloaded from the main body portion of video game device 1, the application program or any of the driver software running on the portable electronic device can be easily modified.

The operation of portable electronic device 100 can be controlled independently of video game device 1, and the application software stored in program memory 41a can be formulated and executed independently of the application software of the video game device. By exchanging data with the video game device, a cooperating operation (linking) may be achieved between the portable electronic device and the video game device. Also, timepiece 45 permits synchronization of the time data of the portable electronic device and the video game device and also allows independent control of the progress of an independently executed game on the portable electronic device in real-time.

Figure 10:
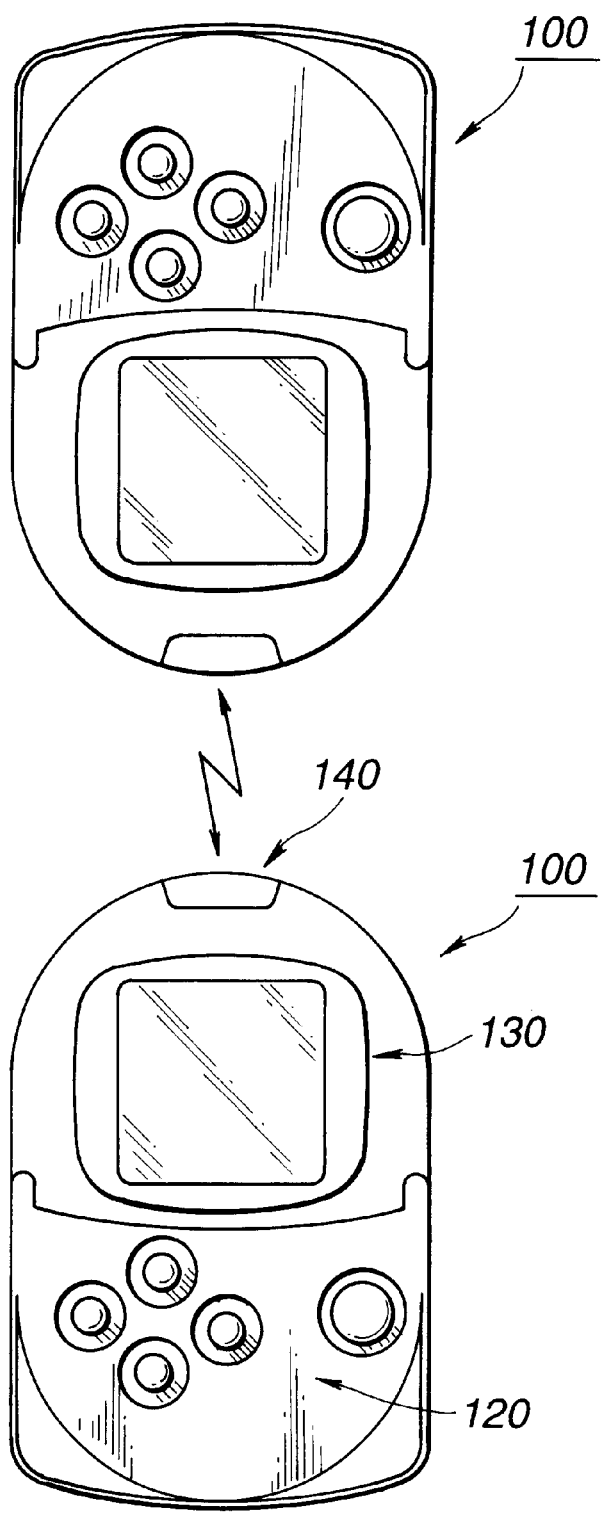
FIG. 10 illustrates a wireless communication function of the portable electronic apparatus of FIG. 5.

FIG. 10 schematically illustrates wireless communication between two portable electronic devices 100 in accordance with the invention. Data stored in the portable electronic device, either from video game device 1 or from another portable electronic device 100, can be exchanged between two or more such devices via wireless communication window 140 such as by IR communication under the control of wireless communication unit 48.

Although portable electronic apparatus 100 has been described as being used as an auxiliary storage apparatus for video game device, the invention is not limited to the video game device and may be used as auxiliary storage, or for retrieving a variety of information in any number of apparatuses.

Figure 11:
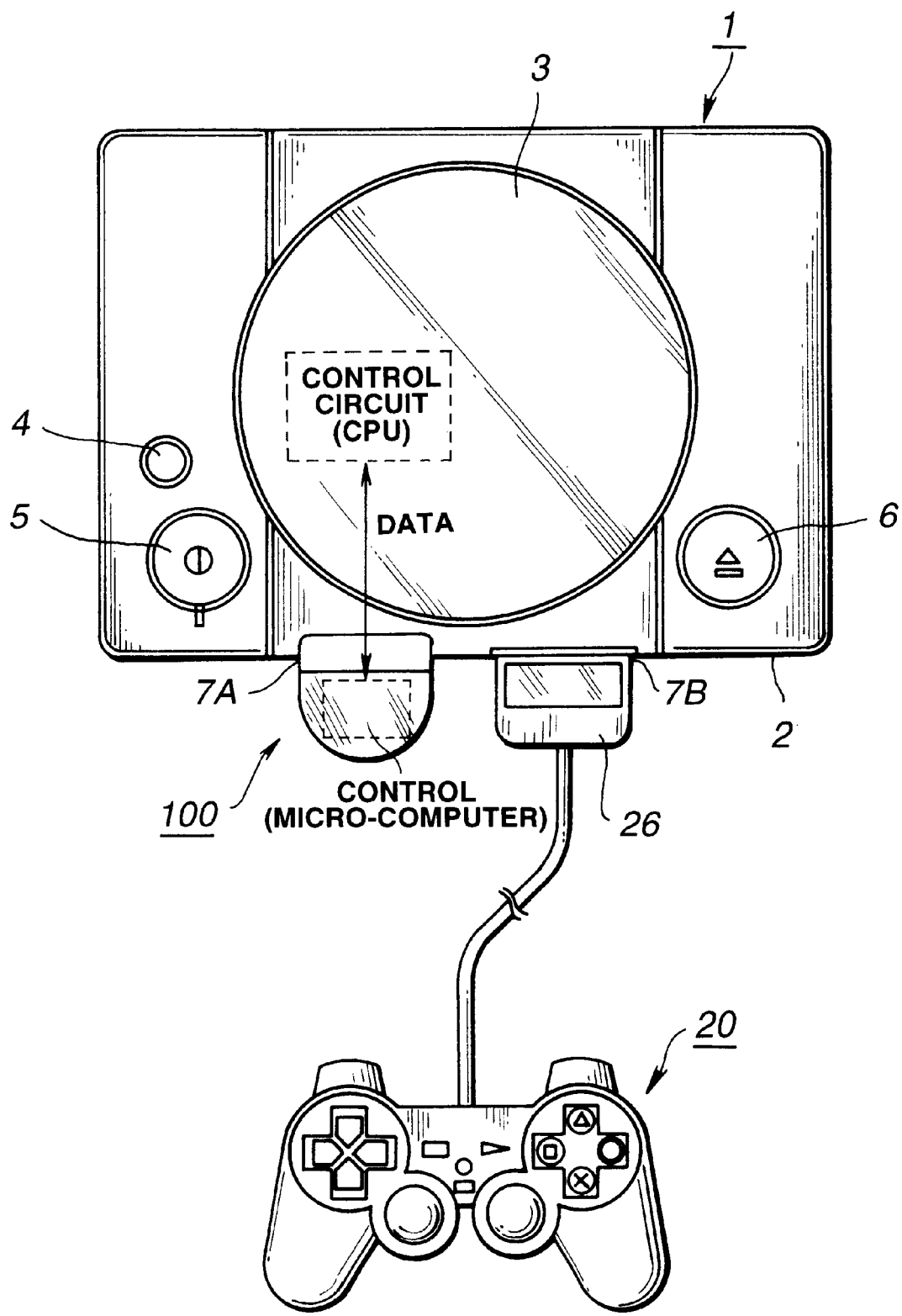
FIG. 11 illustrates cooperative operation between the portable electronic apparatus of FIG. 5 and a main body portion of the video game device of FIG. 1.

The cooperative operation between portable electronic device 100 and video game device 1 will now be explained. The portable electronic device can store game data generated by micro-computer control circuit 41 and used to control the portable electronic device, time data obtained by timepiece 45, and data generated by other portable electronic devices supplied via wireless communication unit 48. FIG. 11 schematically shows the cooperative operation between video game device 1, acting a master device, and portable electronic device 100, acting as a slave device. In the following description, it is assumed that a recording medium, such as an optical disc (CD-ROM), having application software recorded thereon is loaded into the video game device, and that such software is read out therefrom and downloaded onto the portable electronic device inserted into slot 7A or 7B of the main body portion of video game device.

Figure 12:
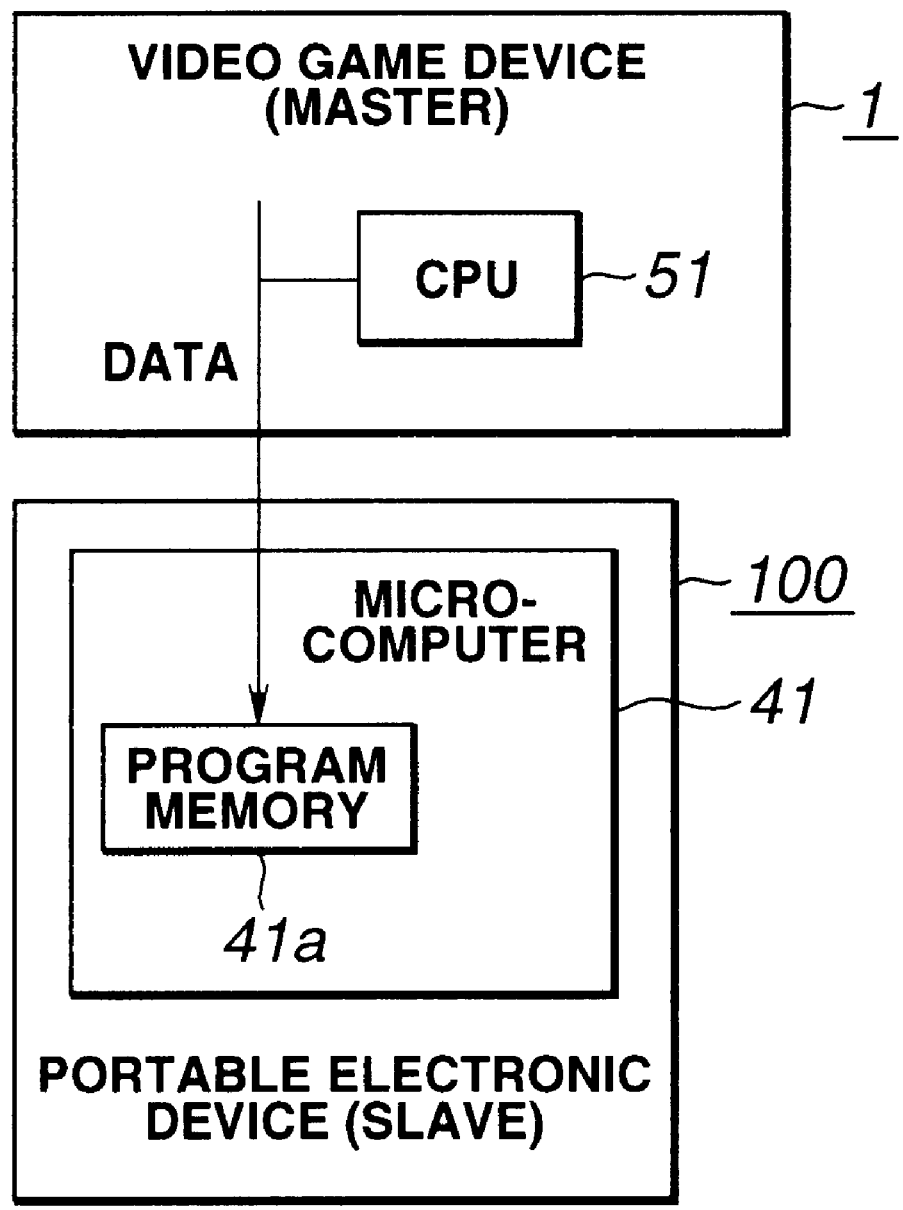
FIG. 12 is a block diagram showing the flow of program data downloaded from the main body portion of the video game device of FIG. 1 to the portable electronic apparatus of FIG. 5.

First, before proceeding to the detailed description of the cooperative operation, program downloading, as a presupposition for this cooperative operation, is explained. FIG. 12 shows the data flow of an application program of a video game finished from the optical disc (CD-ROM) loaded in video game device 1 and transferred directly (downloaded) to program memory 41a of micro-computer 41 of portable electronic device 100. This download is controlled by CPU 51 of video game device 1.

Figure 13:
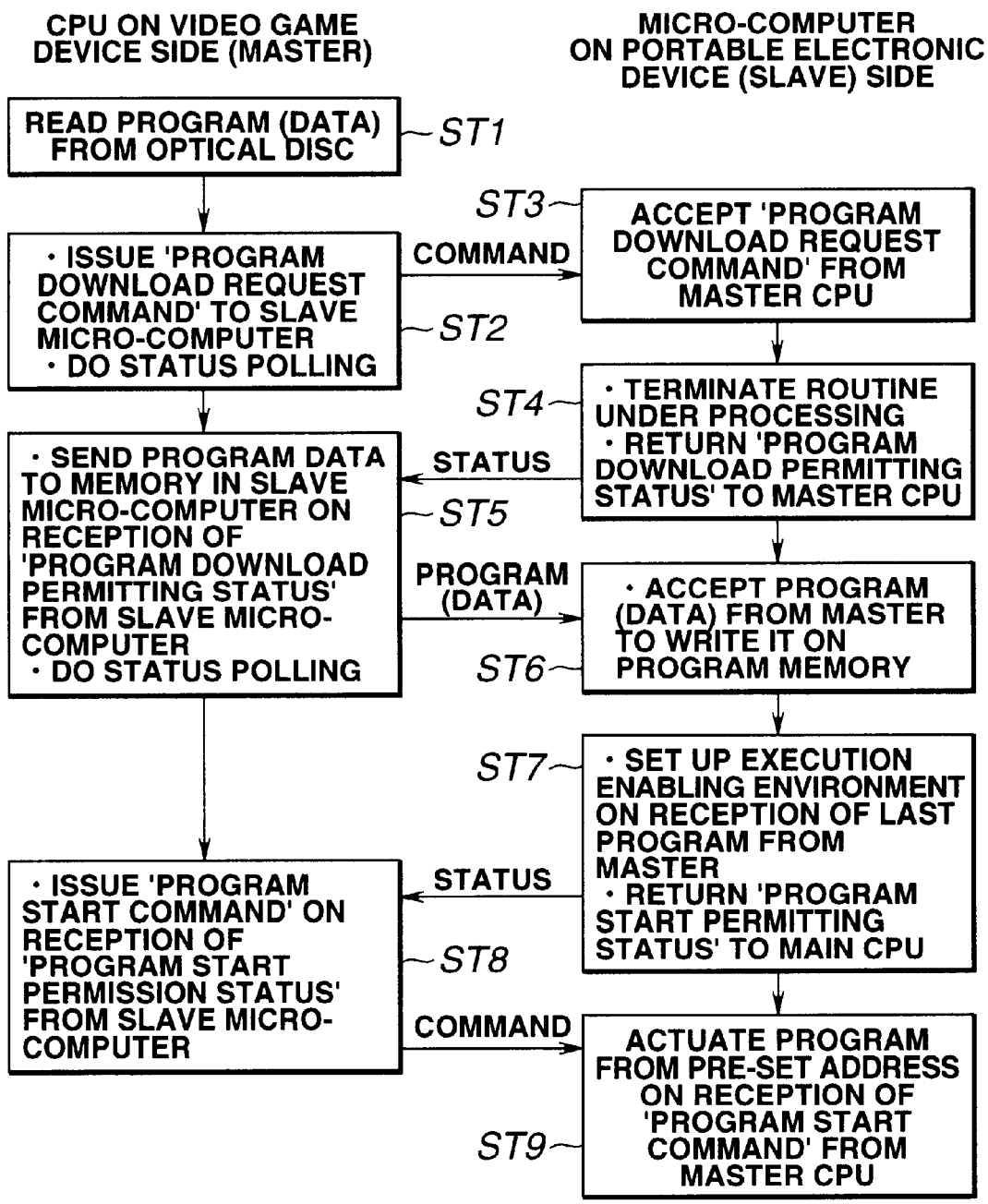
FIG. 13 is a block diagram showing the downloading sequence of FIG. 12.

FIG. 13 shows the sequence of steps performed during the downloading procedure of FIG. 12. First, at step ST1, an application program of a video game to be run on micro-computer 41 in portable electronic device 100, acting as a slave device, is read out from the CD-ROM loaded in video game device 1, acting as the master device.

Then, at step ST2, CPU 51, acting as a control unit for the master device, issues a "program downloading request command" to micro-computer 41, acting as a control unit for portable electronic device 100. CPU 51 then proceeds to a polling step, waiting to receive a "program download permission status" from micro-computer 41.

At step ST3, micro-computer 41 of portable electronic device 100 receives the "program downloading request command" from CPU 51 of the master device.

At step ST4, micro-computer 41 of the slave device terminates the routine currently being executed thereby and returns a "program download permission status" indication to CPU 51 of the master device.

Then, when CPU 51 receives the "program download permission status" from the micro-computer 41, the program read out from the CD-ROM at step ST1 is transferred (downloaded) at step ST5 to program memory 41a of portable electronic device 100. CPU 51 then proceeds to polling for receiving a "program start permission status" from micro-computer 41. The address in program memory 41a to which the downloaded data is written is managed by micro-computer 41; and although it is assumed in the above description that the program downloaded from the master device is stored in program memory 41a of micro-computer 41, the downloaded program may also (or as an alternative) be stored in a storage device, such as SRAM or the like maintained within portable electronic device 100, capable of high-speed data input/output.

At step ST6, micro-computer 41 of the portable electronic device receives the program data transferred from the master device and writes the received program data to program memory 41a.

At step ST7, after micro-computer 41 receives the last of the program data from the master device, and is ready to execute the program data, a "program start permission status" signal is returned to CPU 51 of the master device.

At step ST8, CPU 51 of the master device receives the "program start permission status" signal from micro-computer 41 and issues a "program start command". On reception of the "program start command" at step ST9, micro-computer 41 runs the downloaded program from a predetermined address of memory 41a.

By this sequence of operations, an application program is directly transferred (downloaded) from video game device 1 to program memory 41a in micro-computer 41 in portable electronic device 100. It is noted that the method for supplying the application program is not limited to the recording medium such as an optical disc and may also be supplied over a communication network or from other non-volatile storage. In that case, only the step ST1 in the above sequence need be changed.

Figure 14:
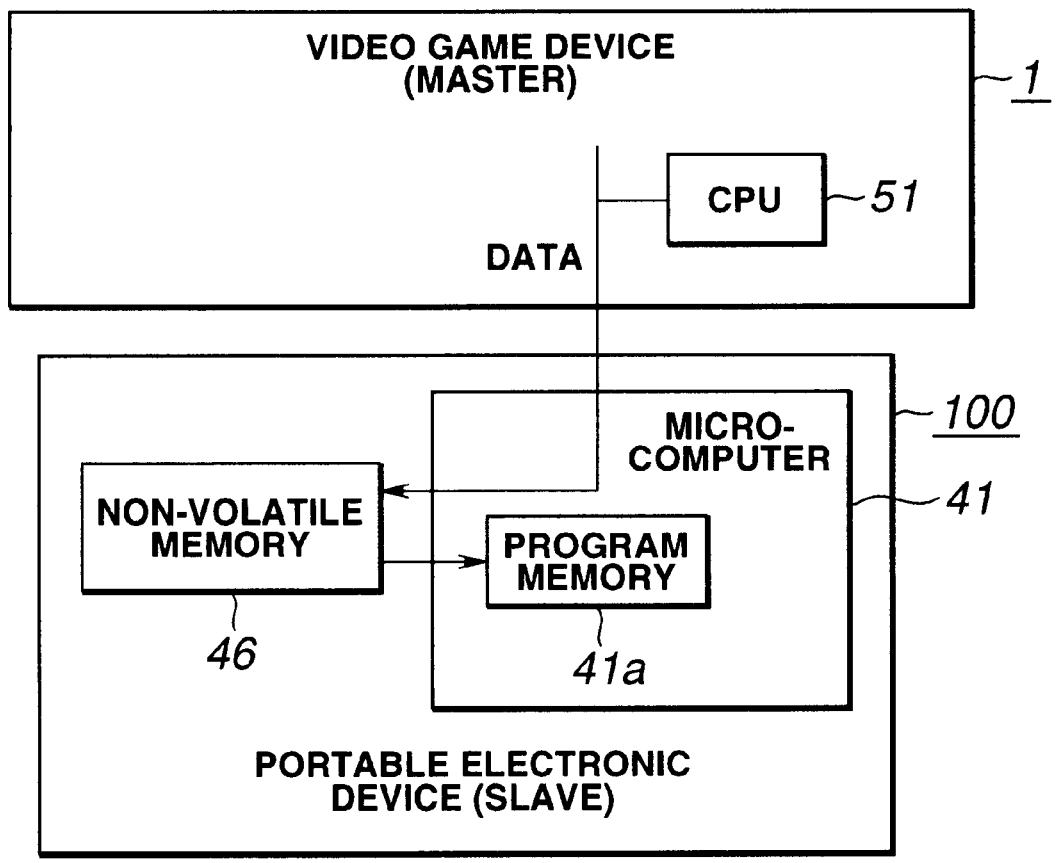
FIG. 14 is a block diagram showing an alternative flow of program data downloaded from the main body portion of the video game device of FIG. 1 to the portable electronic apparatus of FIG. 5.
Figure 15:
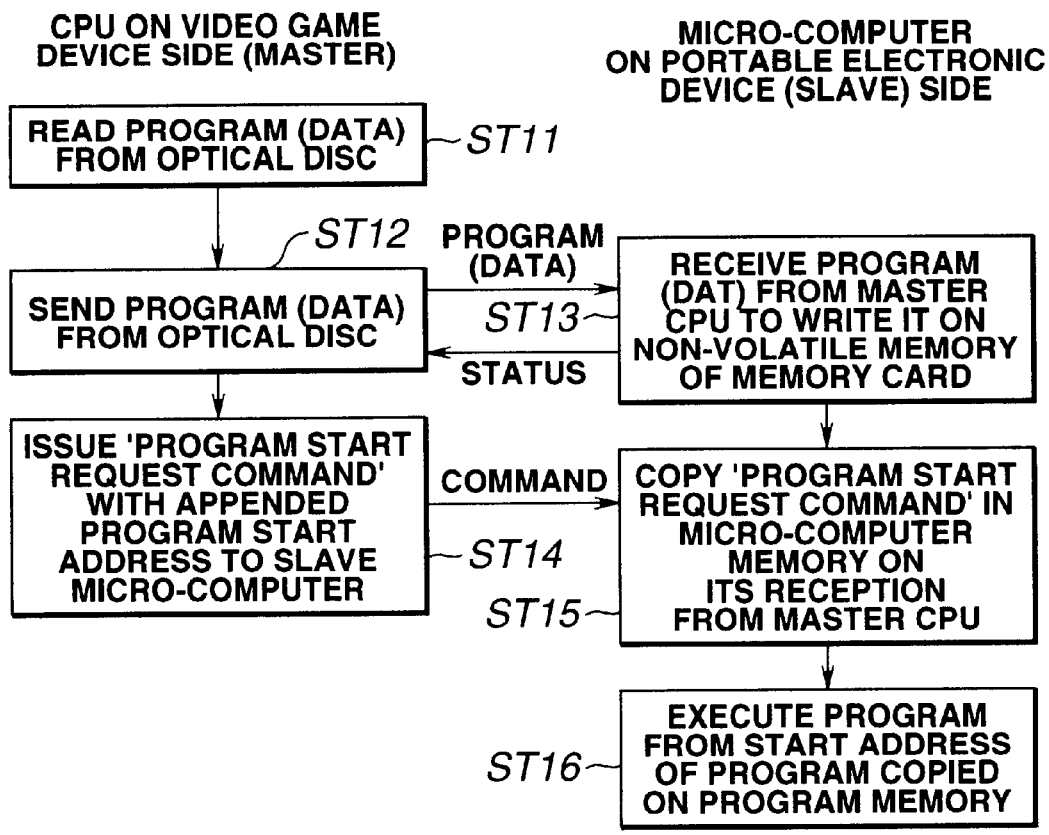
FIG. 15 is a block diagram showing the downloading sequence of FIG. 14.
Figure 16A:
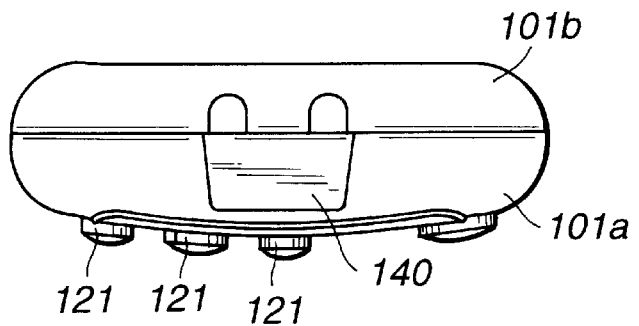
FIGS. 16A, 16B and 16C comprise a tri-plan view showing the top edge, face, and bottom edge of the portable electronic apparatus of FIG. 5.
Figure 16B:
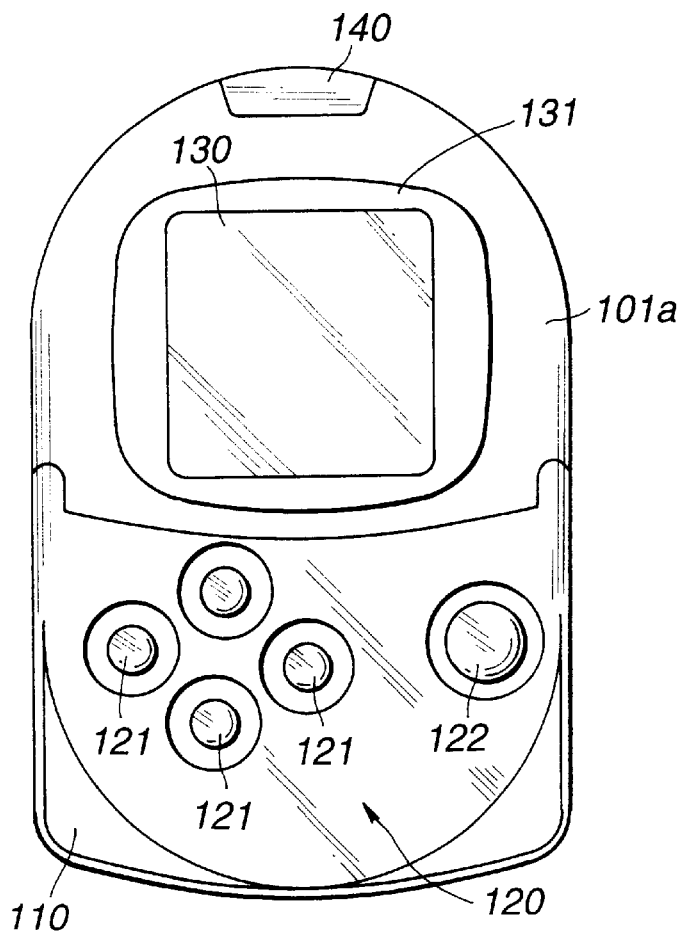
Figure 16C:
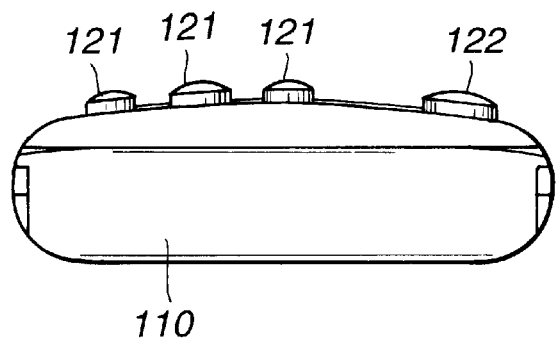
Figure 17:
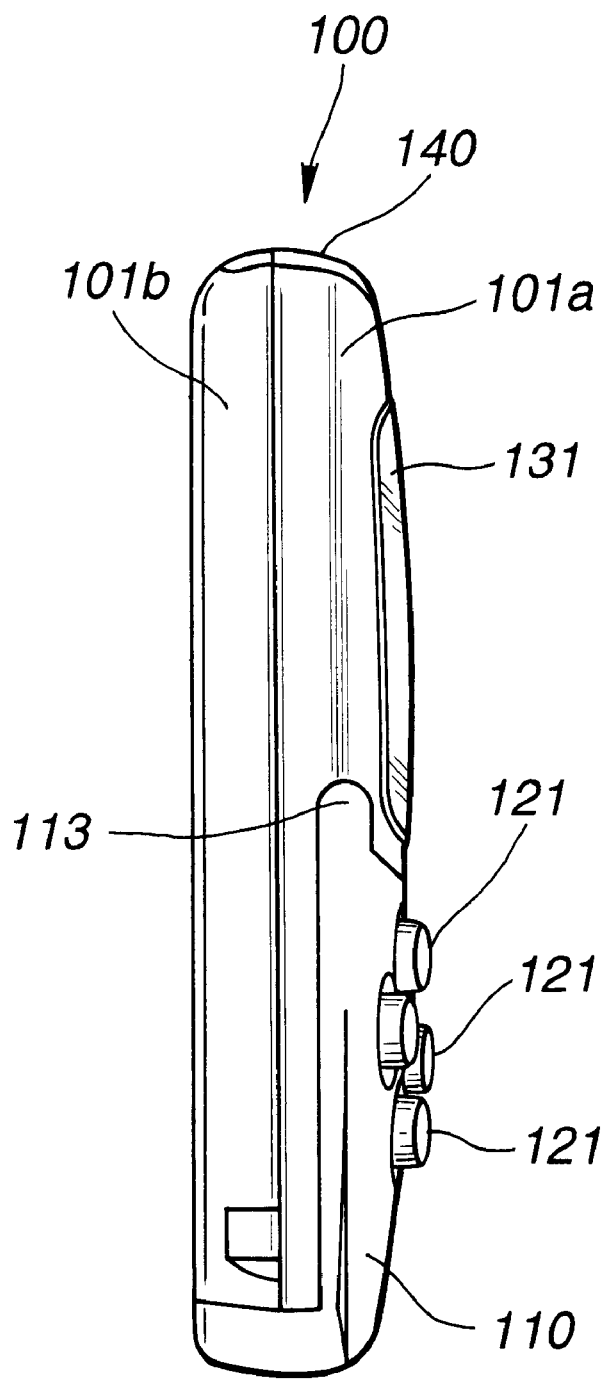
FIG. 17 is a right side elevational view of the portable electronic apparatus of FIG. 5.
Figure 18:
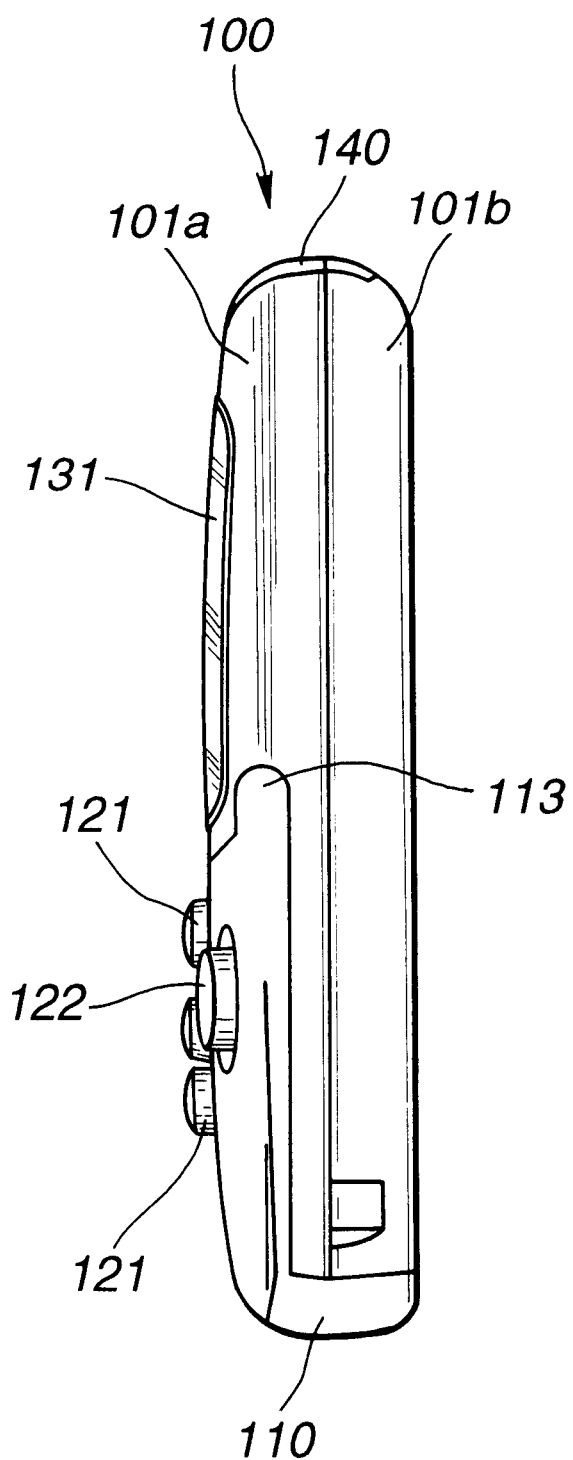
FIG. 18 is a left side elevational view of the portable electronic apparatus of FIG. 5.

While the above-described downloading sequence describes the case of directly downloading the application program from video game device 1 to program memory 41a in micro-computer 41, it is possible first to download the application program to non-volatile memory 46 of portable electronic device 100, and subsequently copy the program data to program memory 41a for execution. FIG. 14 shows the flow of data for this latter case. Specifically, the application program from video game device 1, furnished from e.g., an optical disc loaded in the disc loading unit 3, is transferred (downloaded) to non-volatile memory 46 of portable electronic device 100 via CPU 51, acting as the control unit of the video game device 1. The data is subsequently copied to program memory 41a of micro-computer 41 for execution. FIG. 15 shows this downloading sequence. At step ST11, the application program of the video game to be run on micro-computer 41 in the portable electronic device is read out as data from the CD-ROM loaded in the video game device 1.

At step ST12, CPU 51 transfers (downloads) the application program data read out from the CD-ROM to non-volatile memory 46 of the portable electronic device 100. This sequence is similar to data backup to a memory card in a conventional video game device. At step ST13, micro-computer 41, acting as the control unit for the portable electronic device, receives the application program transferred from CPU 51 in the same sequence as in conventional data backup, in order to write the received data in non-volatile memory 46.

Then, at step ST14, CPU 51 issues a "program start request command" with an appended program start address to micro-computer 41 of portable electronic device 100, which receives the "program start request command" from CPU 51 at step ST15 and in response, CPU 51 copies the commanded data to program memory 41a in micro-computer 41 from the program start address of non-volatile memory 46 in the "program start request command". At step ST 16, micro-computer 41 of the portable electronic device executes from its start address the program copied in program memory 41a.

By the above sequence, the program of the application software is transferred (downloaded) as data via the non-volatile memory 46 from video game device 1 to program memory 41a of micro-computer 41 of portable electronic device 100 inserted into the video game device.

The application program downloaded from video game device 1 to portable electronic device 100 differs generally from that run on the video game device. Of course, the downloaded application program may be operated on both the video game device and the portable electronic device. However, in this case, the video game device runs in a mode in which it only uses those properties and features that are available on the portable electronic device.

Next, the cooperating operation in which the program of the application software downloaded from video game device 1 by the above-described sequence of operations is executed independently on portable electronic device 100. The results of such execution are exchanged (uploaded and downloaded) between the portable electronic device and the video game device. Here, by way of example, attribute data of a person or character appearing in a so-called roll playing game run on the video game device are downloaded to the portable electronic device, the attribute data including data specifying the growth state or other personal characteristics of the person or character. By executing the program on micro-computer 41 in portable electronic device 100, i.e. by playing the game thereon, this attribute data is changed independently of the program executed on video game device 1. Thus, the portable electronic device 100 of the present invention is designed to operate by itself without connection to video game device 1, and is small-sized and readily portable. A user (game player) can carry the portable electronic device and manipulate or change the attributes of the person or character appearing in the program executed thereon by playing the game; and the user can transfer (upload) to the video game device the attributes of the person or character that have been manipulated. In this case, the person or character whose attributes have been changed can be retrieved and operated in the program run on video game device 1. Of course, in addition to role playing games, any other type of game may be downloaded from the video game device to the portable electronic device, played by a user, and the results thereof then may be loaded back to the video game device, as desired.

As described above, a video game can be constructed in which the cooperating operation can be performed by both video game device 1 as the master device, and portable electronic device 100 as the slave device, in which both can use the attribute data of, for example, a person appearing in the game to affect mutually the attribute data.

Figure 19:
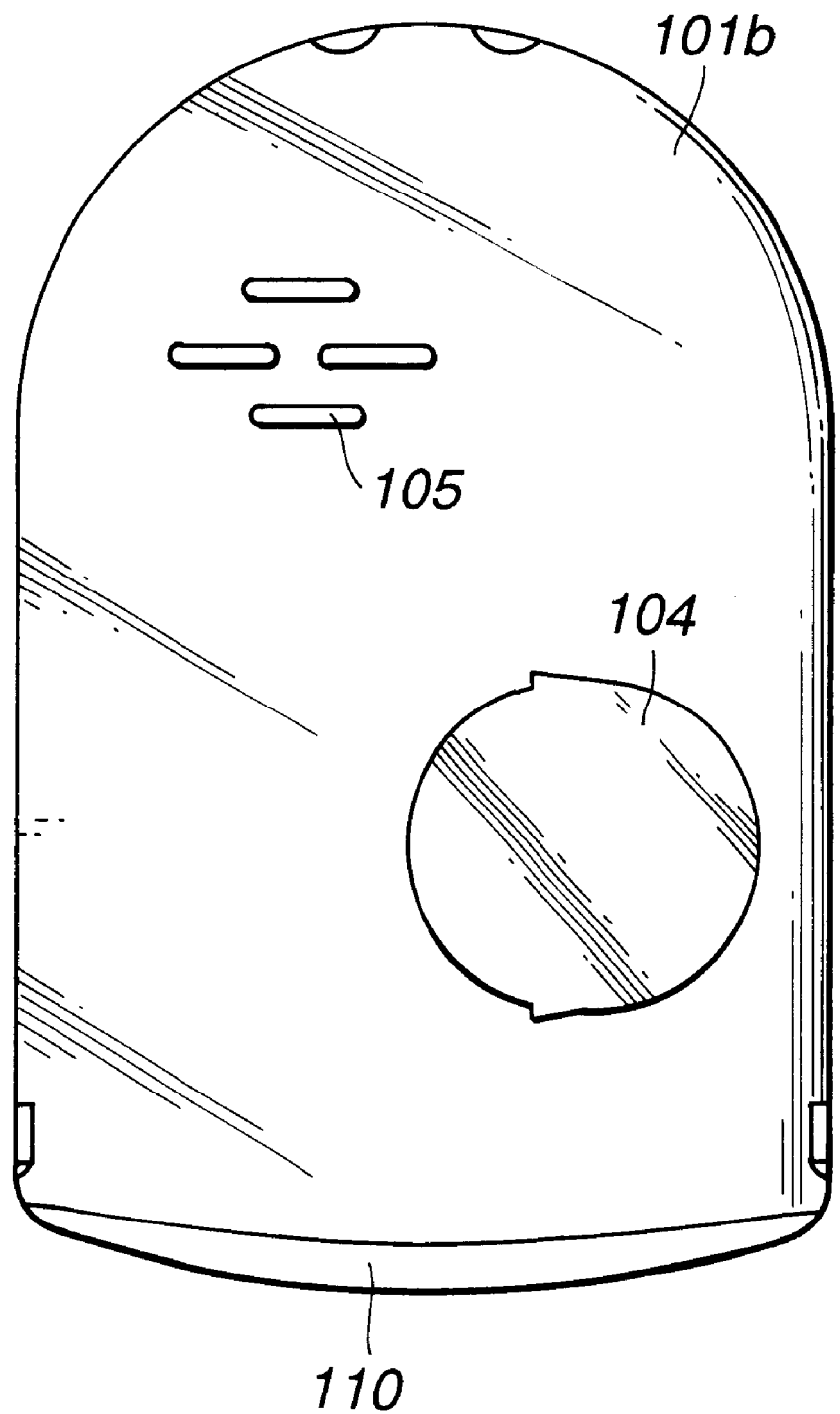
FIG. 19 is a backside elevational view of the portable electronic apparatus of FIG. 5.

A battery holder 104 is mounted on the back side of housing 101 as shown in FIG. 19 and is adapted to hold a battery therein. The battery furnishes the driving power to each component of the portable electronic device. Battery holder 104 is mounted on housing 101 for closing a through-hole formed in the back surface of the housing and can be selectively mounted on or dismounted from the housing. Battery 155 is a substantially disc-shaped so-called button battery. When battery holder 104 is mounted on housing 101, battery 155 is held therein so that its outer peripheral surface, which acts as a positive electrode, abuts against a positive source terminal provided on substrate 151. Furthermore, the major surface of the battery, which acts as a negative electrode, abuts against a negative power source terminal provided on substrate 151

A reset button (not shown) is mounted on the back side of the housing 101 for resetting all parameters back to factory-set values. This reset button can be operated by a pin or the like. A speaker 105 is disposed on the back side of the housing to produce audio sound, as shown in FIG. 19.

Figure 20:
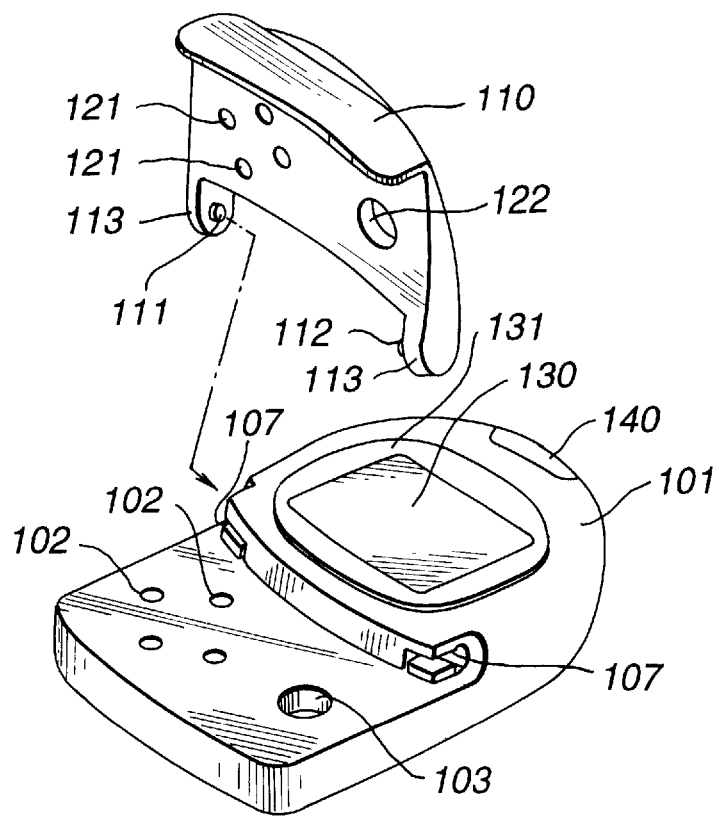
FIG. 20 is a perspective view of the portable electronic apparatus of FIG. 5 with a lid thereof removed.

Portable electronic device 100 is formed with a terminal 152 in housing 101 providing an electrical connection with an external device such as video game device 1. Terminal 152 is covered and protected by a lid 110, and is exposed to the outside of housing 101 via a connector 150 which is a through-hole provided in the housing. FIGS. 16a to 16c and FIGS. 17–19 show a top plan view, a front elevational view, a bottom plan view, left and right side elevational views, and a back elevational view, respectively, of the portable electronic device. Lid 110 is supported so as to be pivotable, or rotatable, between a first closed position, that covers terminal 152 and a second, opened position in which terminal 152 is exposed. Specifically, lid 110 is formed with a pair of laterally spaced arms 113, 113 which carry a pair of facing stubs 111, 112 adapted to be fitted in a pair of supporting holes 107, 107 laterally provided on the mid surface of housing 101 to rotatably support the lid, as shown in FIG. 20.

Figure 21:
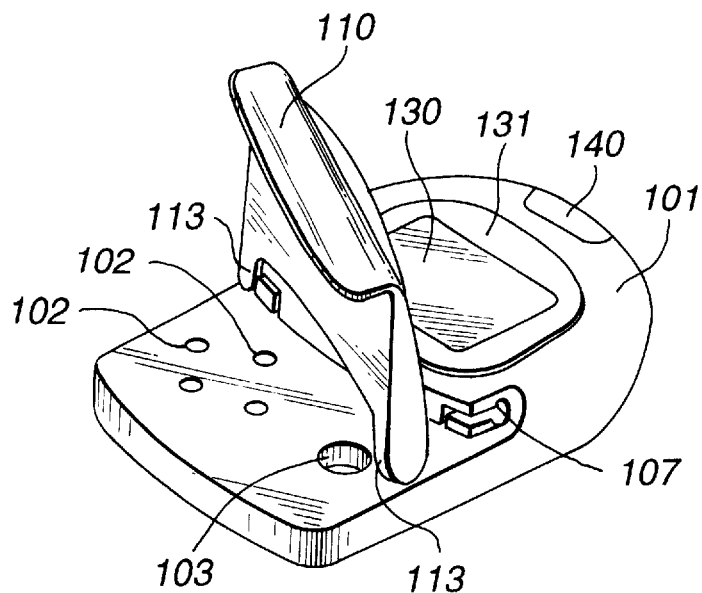
FIG. 21 is a perspective view of the portable electronic apparatus of FIG. 5 showing the lid being removed.

Housing 101 is designed so that even when lid 110 is opened, that portion of the housing that includes connector 150 may be fitted into slots 7A or 7B of video game device 1 so that terminal 152 of the portable electronic device can be connected to the video game device, as shown in FIG. 3. Referring to FIGS. 20 and 21, lid 110 is removably mounted on housing 101. At least one of the supporting stubs 111 and 112 of lid 110 can be reduced elastically in diameter by being formed with opened hollow portions in the distal and peripheral portions thereof. Housing 101 is formed with a groove extending from a supporting hole 107 into which supporting stub 111 (or 112) is fit. The supporting stub passes through groove 108 when its diameter is reduced, thereby allowing lid 110 to be selectively mounted on or dismounted from the housing 101.

Figure 22:
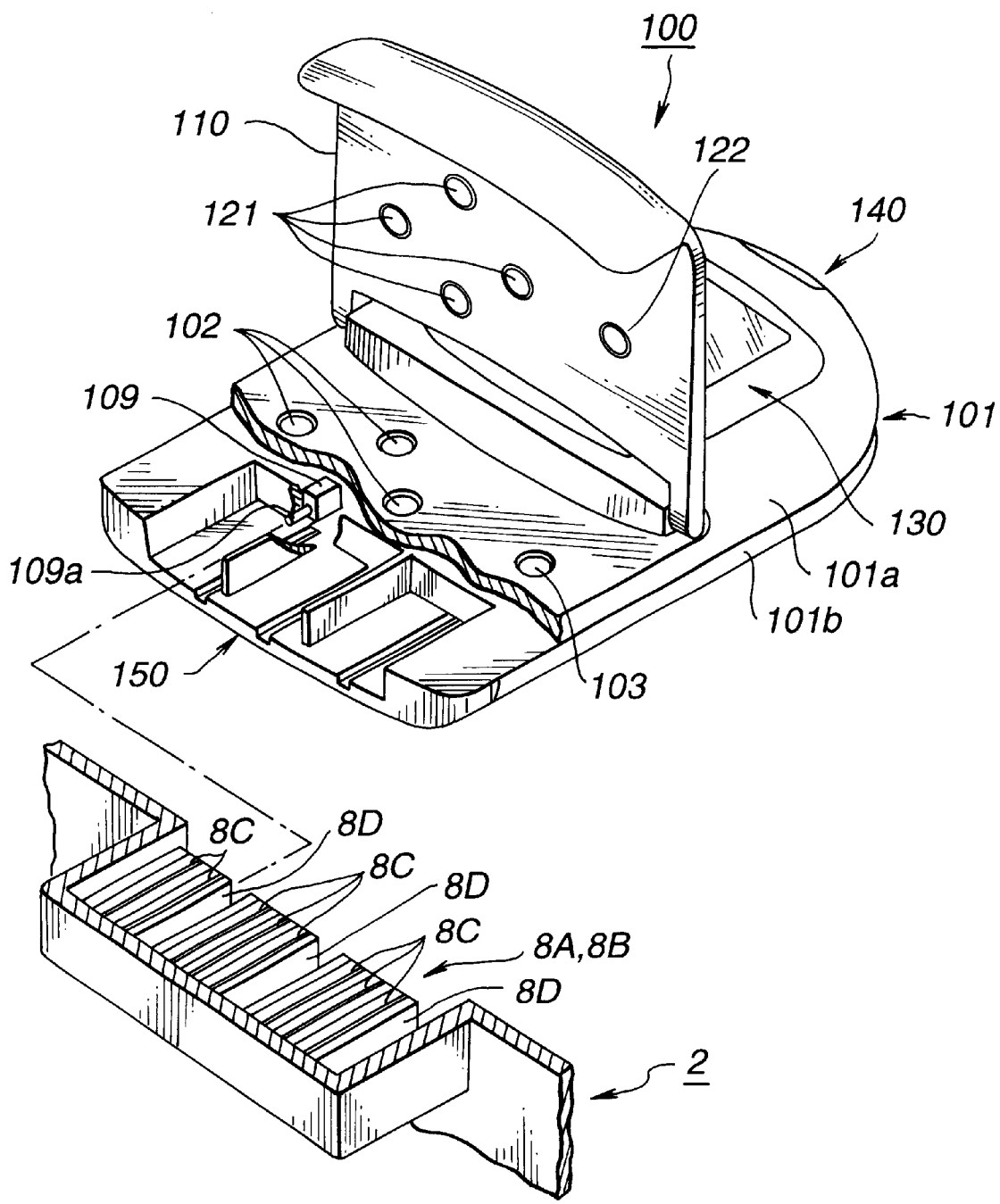
FIG. 22 is a cutaway perspective view depicting a direction discrimination switch and coupling thereof with an electronic apparatus.

As is shown in FIG. 22, within a window of connector 150 is mounted a direction discrimination switch 109. This direction discrimination switch is mounted in a direction so that a force-receiving element 109a thereof faces the outside of the window portion of the connector. When the portion of housing 101 of portable electronic device 100 including connector 150 is inserted into one of memory card insertion units 8A or 8B, a terminal block 8D, provided in the memory card insertion units, is inserted in the window of the connector. Terminal block 8D pushes on force receiving element 109a of direction discrimination switch 109. Terminal block 8D is divided into a plurality of sections, similar to the division of the window of connector 150 into a plurality of sections. On the upper surface of each section of terminal block 8D are formed a plurality of terminal plates 8C which are brought into contact with terminal 152 (see FIG. 8) upon the insertion of terminal block 8D into the window of connector 150.

Figure 23:
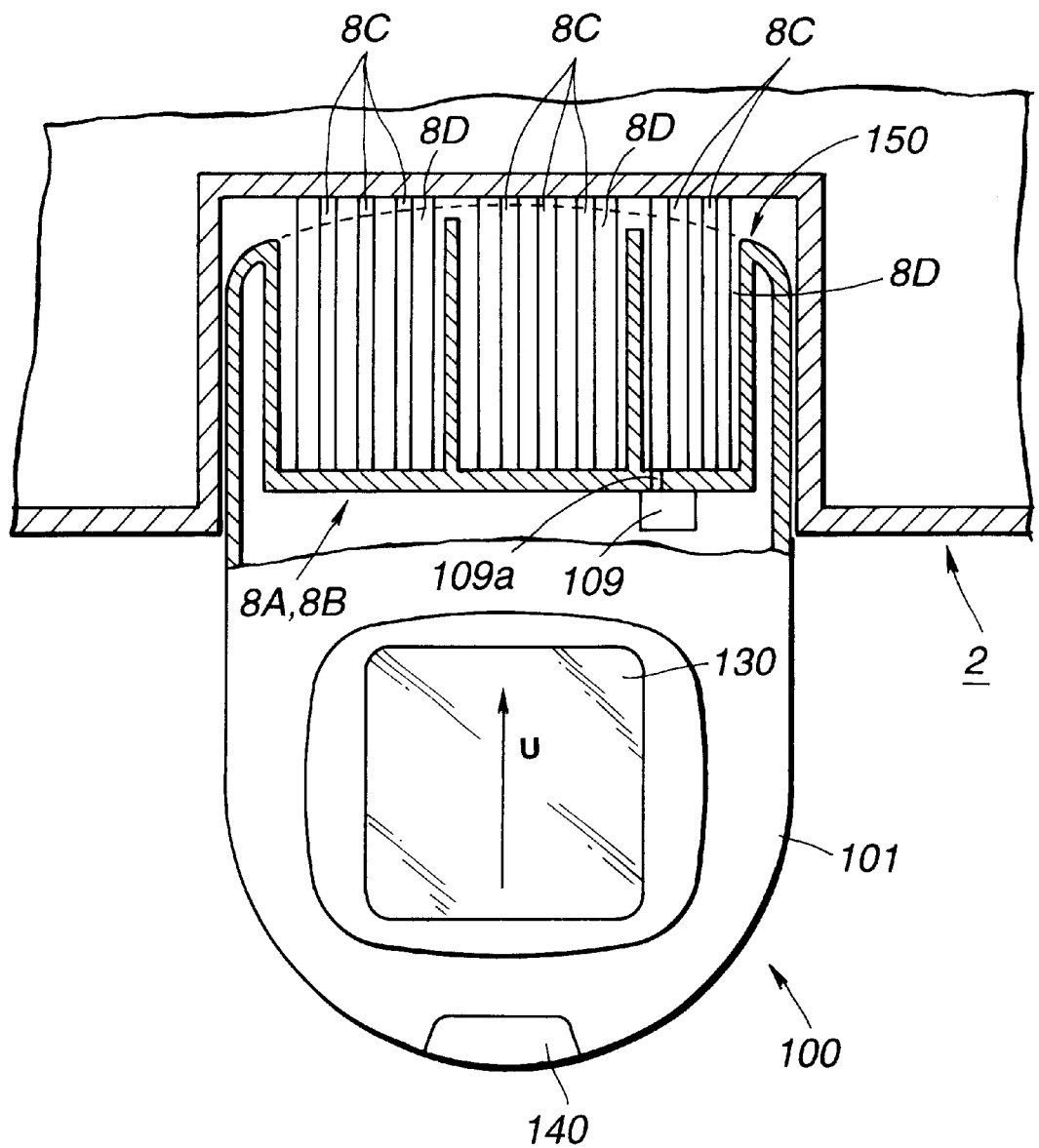
FIG. 23 is a cross-sectional view depicting the insertion of the portable electronic apparatus of the invention in an electronic apparatus in a first orientation.

If terminal block 8D pushes on force receiving element 109a upon insertion of portable electronic device 100 into the window of connector 150, picture processing device 62 insures that information displayed on display 130 will be in an upward, properly viewable orientation as indicated by arrow U in FIG. 23. Even though connector 150 is positioned on the upward side of the display, the contents thereof will be normally viewable by a user. The picture signals are written from frame buffer 63 to a reverse address on the display, obtained by tracing backwards on the display as compared with a standard scan of the display. This upside-down display can also be realized by reading out picture signals from frame buffer 63 from the opposite side from which the addresses were written in the frame buffer, and then scanning the display in a standard direction.

Figure 24:
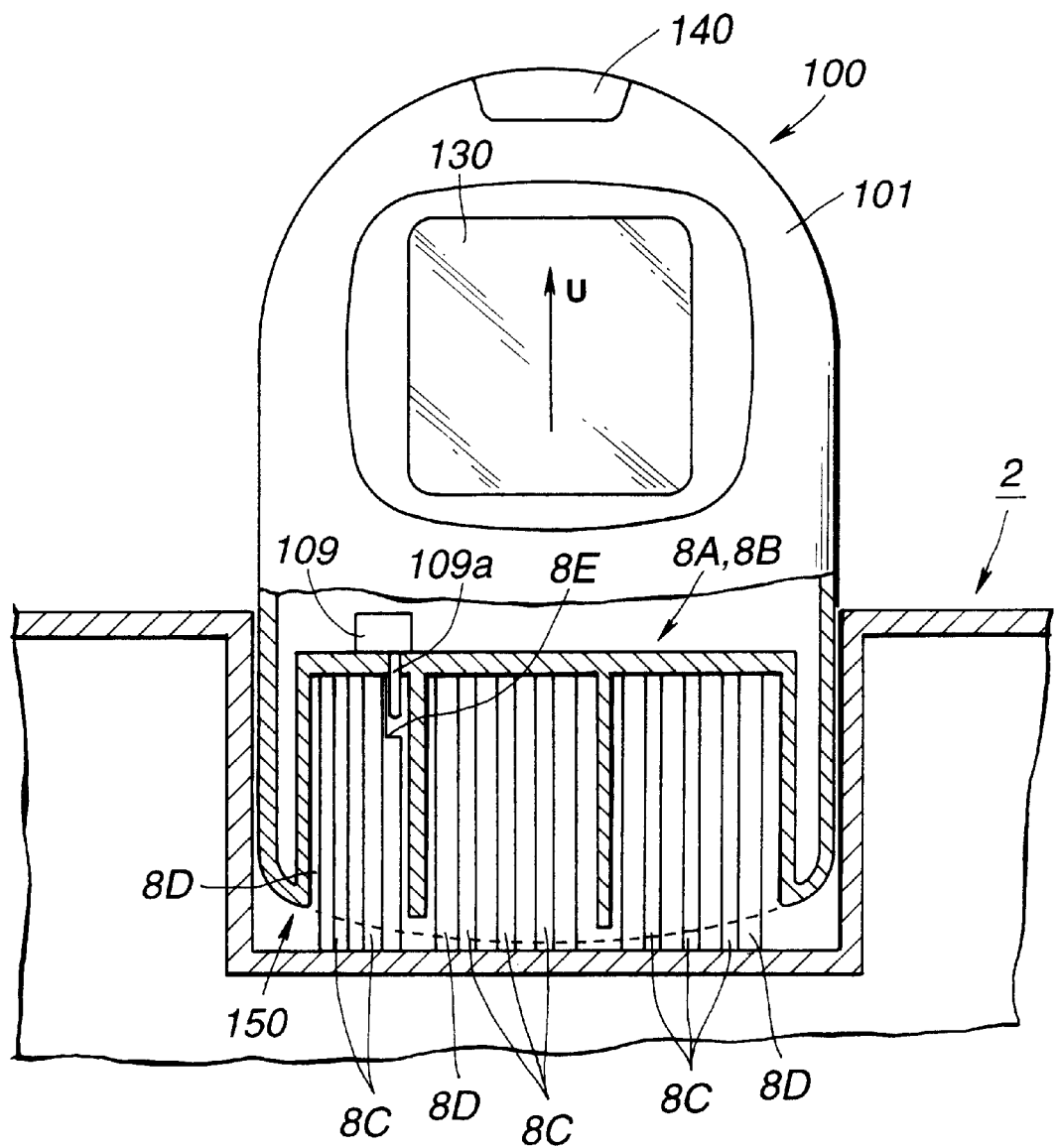
FIG. 24 is a cross-sectional view depicting the insertion of the portable electronic apparatus of the invention in an electronic apparatus in a second orientation.

As shown in FIG. 24, if the portable electronic device is mounted on main body portion 2 of the external device in a different orientation from that shown in FIG. 23, a cut-out 8E is provided at a portion of terminal block 8D in registration with force-receiving element 109a of direction discrimination switch 109. Thus, the terminal block does not push on force-receiving element 109a, force-receiving element 109a being received in cut-out 8E. Picture processing device 62 displays an image on display 130 is in an upwardly directed, normally oriented display, as indicated by arrow U in FIG. 24. Connector 150 is positioned at a lower side of the display contents.

Figure 26:
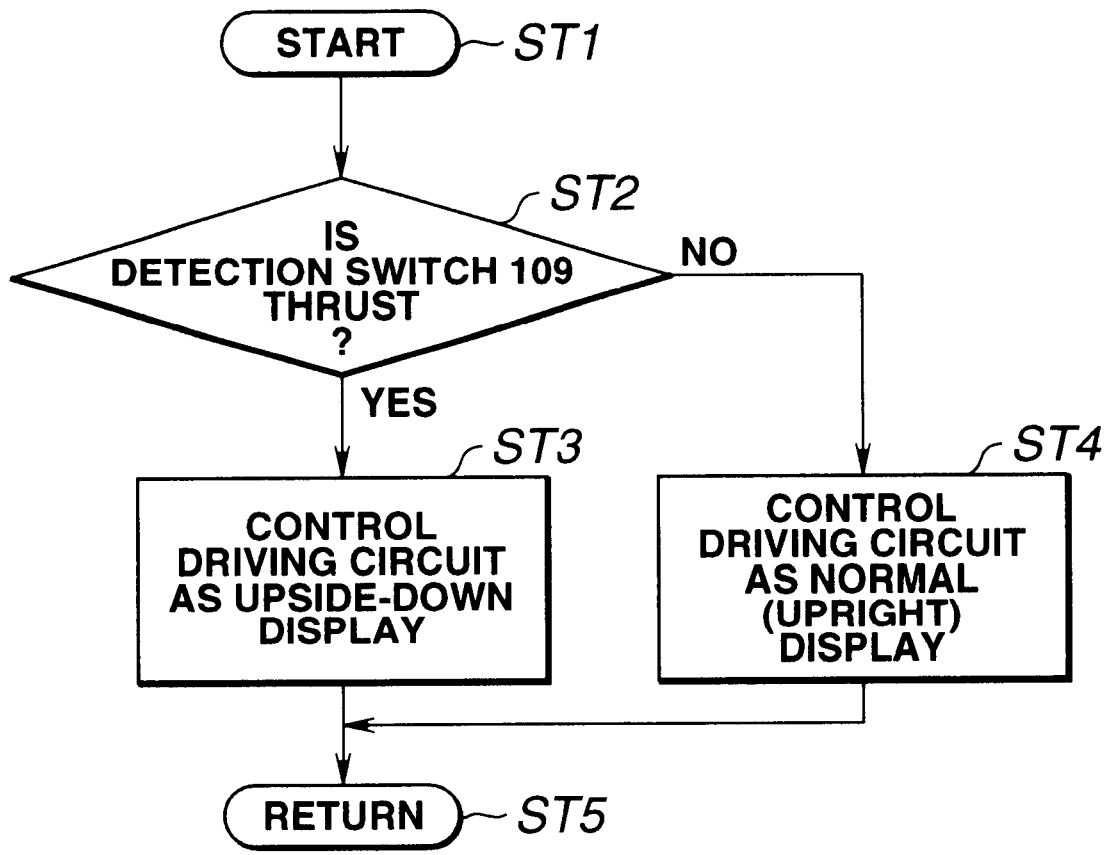
FIG. 26 is a flowchart depicting the steps of determining the orientation of the portable electronic apparatus and display in accordance with the invention.

Referring next to the flowchart of FIG. 26, the operation of picture processing device 41 begins at step ST1. At step ST2 it is determined whether or not direction discrimination switch 109 has received a force. If the inquiry is answered in the affirmative and thus direction discrimination switch 109 has received a force, processing transfers to step ST3. If the inquiry is answered in the negative and direction discrimination switch 109 has not received a force, processing transfers to step ST4. At step ST3, the display is controlled to present an upside-down display of an image on display 130 before the processing transfers to step ST5. At step ST4, the display is controlled to present a normally oriented display on display 130 before processing transfers to step ST5, and is completed.

Figure 25:
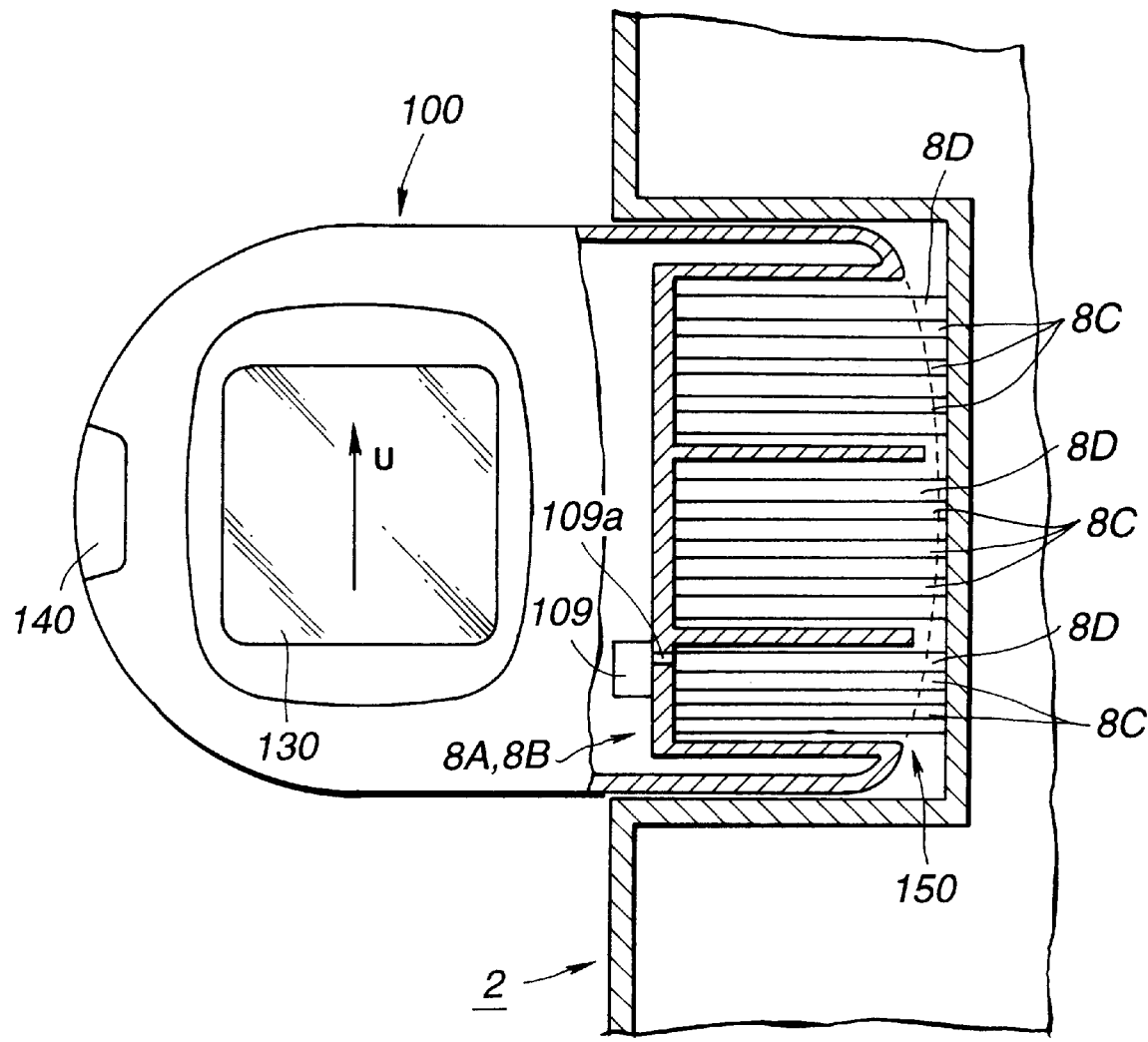
FIG. 25 is a cross-sectional view depicting the insertion of the portable electronic apparatus of the invention in an electronic apparatus in a third orientation.

If portable electronic device 100 is mounted on the lateral side of main body portion 2 of the external equipment, as shown in FIG. 25, picture processing device 41 performs picture processing to display an image on the display in upward orientation as indicated by arrow U in FIG. 25. Thus, connector 150 is positioned laterally as compared with the display.

Figure 27:
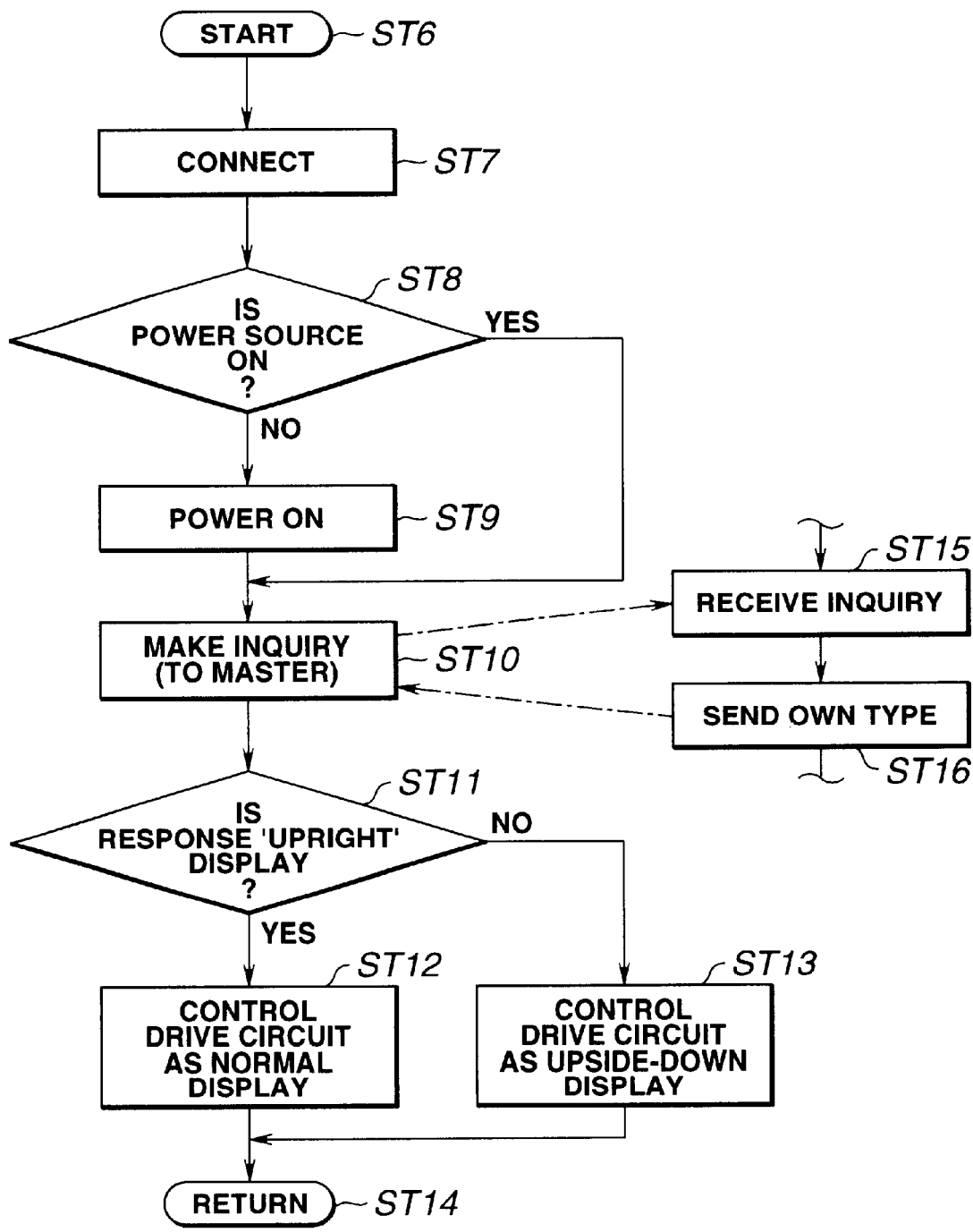
FIG. 27 is a flowchart depicting the steps of operation of the electronic apparatus and portable electronic apparatus in accordance with the invention.

In the portable electronic device of the invention, the orientation discriminator for discriminating the orientation of the portable electronic apparatus when mounted on the external device is not limited to that employing the direction discrimination switch 109 described above, but may be designed to receive electronic discrimination signals from the external device to determine the orientation based on the received discrimination signals. When such orientation discrimination signals are employed, operation begins at step ST6 as shown in the flowchart of FIG. 27. At step ST7, portable electronic apparatus 100 is connected to the external device. Then, at step ST8, it is determined whether or not the power source is on. If the inquiry is answered in the affirmative, and the power source is on, processing proceeds to step ST10. If the inquiry is answered in the negative, processing proceeds step ST9 to turn on the power before proceeding to step ST10. At step ST10, inquiries are made to the external device (master device) as to the orientation of portable electronic device 100 relative to the external device. On reception of the inquiry signal from the portable electronic device at step ST15, the external device sends an orientation signal specifying the orientation of the portable electronic device relative to the external equipment. On reception of the response to the orientation inquiry at step ST10, the portable electronic apparatus device determines a course of action to be followed in accordance with the returned response signal at step ST11. If the results of the orientation inquiry indicate that upside-up, normal display of the image on the display is to be made, processing proceeds with step ST12, wherein the image is normally displayed, and then processing proceeds to step ST14. If the results of the orientation inquiry indicate that upside-down, inverted display is to be made, processing proceeds with step ST13, wherein the image is displayed inverted, and then processing proceeds to step ST14. At step ST14, control exits from the orientation inquiry, and returns to standard processing. Although not shown, if the results of the orientation inquiry indicate that a sideways display is to be made, control is performed to perform sideways display. Thus, in the portable electronic device constructed in accordance with the invention, a proper, normal display can be made so that the user will properly view the display without regard to the orientation of the portable electronic apparatus upon connection to the external device.

Figure 28:
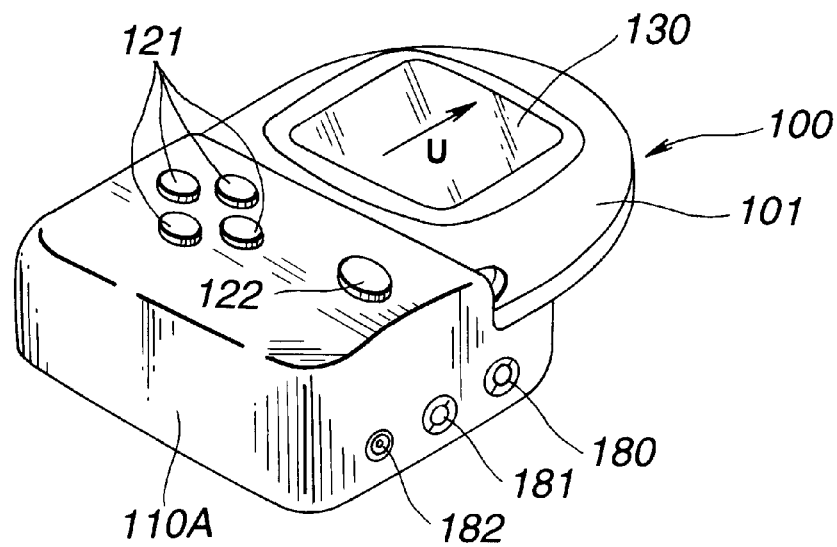
FIG. 28 depicts the insertion of a portable electronic apparatus into an adapter in accordance with the invention.

In accordance with portable electronic device 100 constructed in accordance with the invention, after lid 110 is removed therefrom, the portion of the apparatus previously covered by lid 110 can be plugged into an adapter 110A, and be placed in electronic communication therewith via connector 150 as shown in FIG. 28. Adapter 110A is adapted to perform various functions. Adapter 110A is formed with, in addition to actuator buttons 121, 122, a microphone input terminal 180, a speaker output terminal 181 and an external power source input terminal 182. The microphone input terminal can be connected to a microphone to allow a user to play a game stored in the portable electronic device employing speech input, or to record the input sound. The speaker output terminal can be connected to a speaker or a headphone device to reproduce output sound in accordance with a game or other program being executed by the portable electronic device. The external power source input terminal can be fed with power for driving the adapter and the portable electronic device from an external power source, such as an electric lighting line, via a rectifier or a transformer, such as a so-called AC adapter. This supplied power may also be used to recharge any rechargeable battery capacitor, or other power storage device maintained within the portable electronic device.

Within adapter 110A may be provided a tuner (AM tuner, FM tuner or a TV tuner), a vibration generating mechanism, reception circuits, such as a body temperature sensor, a pedometer, expansion memory, an angular sensor (tilt sensor or vibration sensor), a variety of sensors and driving units. These features can be used alone or can be used as inputs or outputs in response to input user information, game program instructions, or game program results generated in the course of execution of a game being played on the portable electronic device. If the reception circuits or sensors are used alone, display 130 can serve as a display for indicating values measured by the reception circuits or sensors. The display may also be adapted to display current time or the number of memory blocks and the residual number of blocks indicating the storage capacity of the portable electronic device, thus providing an indication of the ability of the portable electronic device to be used as a conventional memory card, or for use in any other function requiring a defined amount of available memory.

When portable electronic device 100 is connected to the adapter 110A, it may also be used as an alarm for actuating any one or more of a plurality of units electrically coupled with the adapter at specified times as set on the portable electronic device. The units actuated at specified times may include, but are not limited to a radio tuner, a vibration generator, and a light emitting means, for emitting IR and visible light rays.

Figure 29:
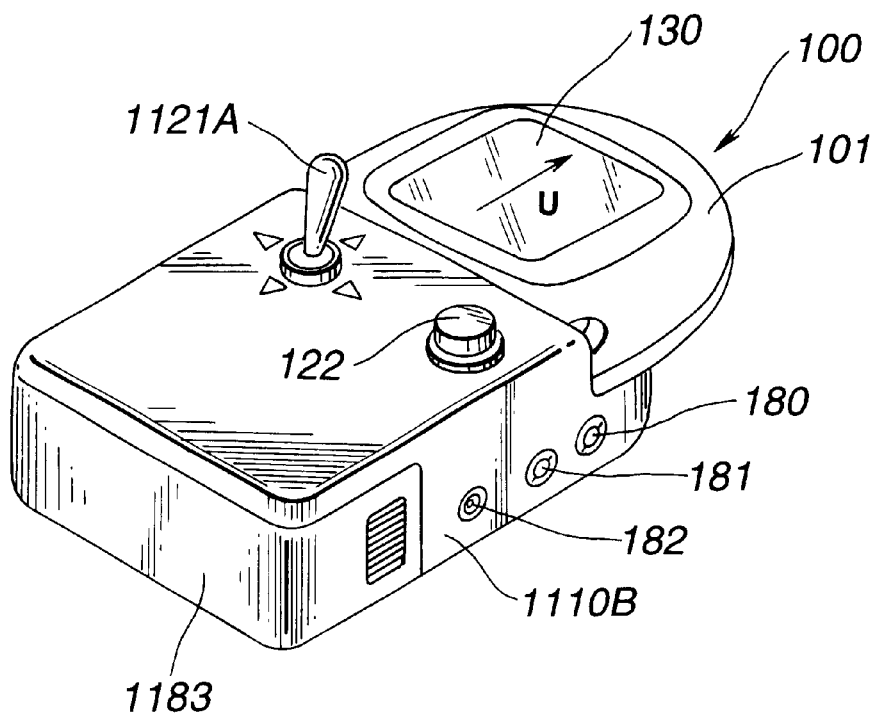
FIG. 29 depicts the insertion of a portable electronic apparatus into an adapter in accordance with an alternative embodiment of the invention.
Figure 30:
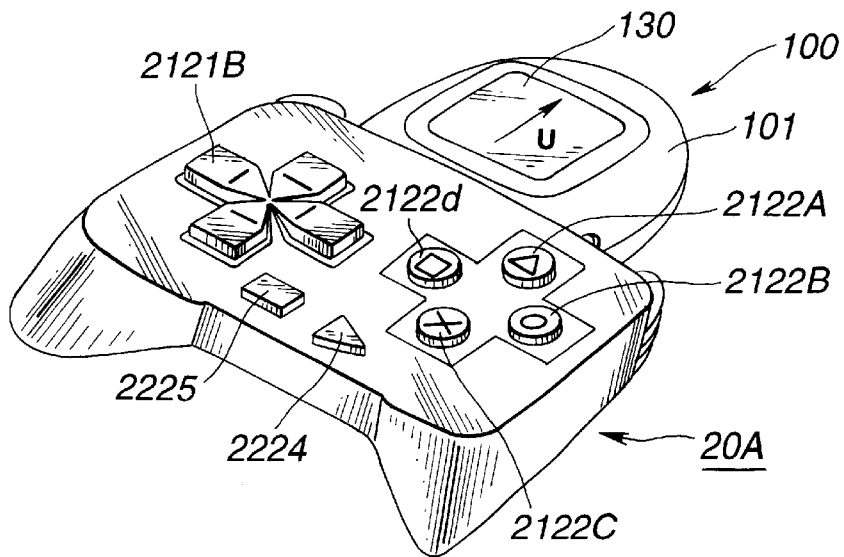
FIG. 30 depicts the insertion of a portable electronic apparatus into an adapter in accordance with an additional alternative embodiment of the invention.

Adapter 1110B may also be provided with a reinforcing battery (cell) 1183 for furnishing power to the portable electronic device enclosed therein, as is shown in FIG. 29, in an alternative embodiment of the invention. In adapter 1100B, plural actuator buttons 121 may be replaced by a sole operating lever 1121A. It is also possible to provide a number of actuator buttons that is different from the number of switch elements provided on housing 101 so that the switch elements on housing 101 can be actuated in accordance with a pre-set relation between the actuator buttons and switch elements. By way of example this relation may include the actuation of a first switch element upon the simultaneous actuation of the first and second actuator buttons and the actuation of a second switch element upon the simultaneous actuation of the second and third actuators. In addition, if lid 110 is removed from portable electronic device 100, the portion thereof previously covered by the lid can be plugged into a connection portion of an adapter 20A to electrically connect connector 150 of the portable electronic device to the adapter, as shown in FIG. 30. Similarly to controller 20, adapter 20A is formed with a plurality of actuator buttons 2121B, 2122A, 2122B, 2122C, 2122D, start button 2224 and a selection button 2225, and has an internal vibration setting unit, not shown, in a format similar to that of controller 20. A game or other program being executed proceeds in response to actuation of actuator button 2121B, 2122A, 2122B, 2122C and 2122D and the buttons 2224, 2225. The game picture or other image is displayed on display unit 130.

Figure 31:
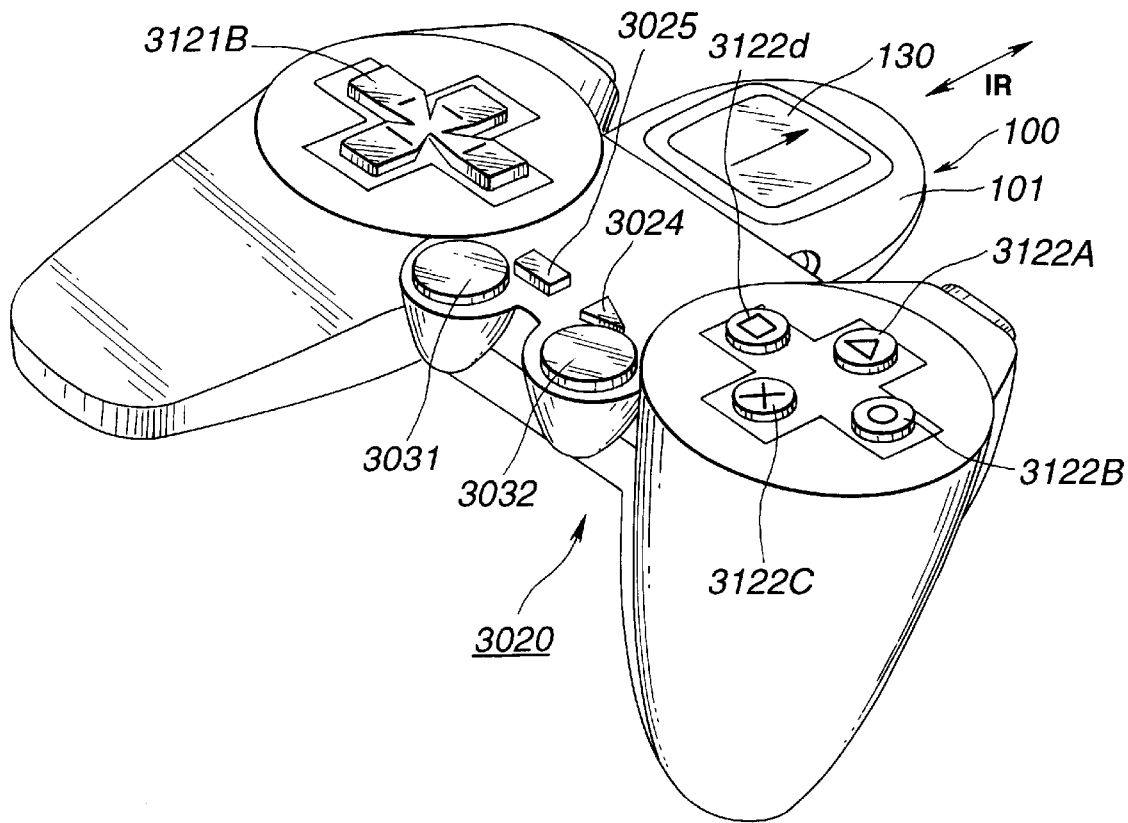
FIG. 31 depicts the insertion of a portable electronic apparatus into a controller in accordance with the invention.

A controller 3020 may be provided with a connection unit for connection to connector 150 of portable electronic device 100, as shown in FIG. 31 The connection unit is configured similarly to controller 20, of video game apparatus 1, controller 3020 being formed with a plurality of plural actuator buttons 3121B, 3122A, 3122B, 3122C, 3122D, a start button 3024, a selection button 3025 and an internal vibration setting unit, not shown. In addition, controller 3020 is also formed with actuator units 3031, 3032 capable of analog operations, and a mode selection switch for selecting the actuating mode of actuator units 3031, 3032. When the portable electronic device is connected to the controller, a game or other program proceeds in response to actuation of actuator buttons 3121B, 3122A, 3122B, 3122C, 3122D, buttons 3024, 3025 or the actuator units 3031, 3032. Graphical images in accordance with execution of the game or the like are shown in display unit 130.

When portable electronic device 100 is mounted on controller 3020, the controller can use portable electronic apparatus as an IR transmission and reception apparatus for exchanging information signals between the controller and the external device by transmission/reception of IR rays, as shown by arrow IR in FIG. 31. By connecting a second portable electronic device to main body portion 2 of the external device and by having transmission/reception of IR rays between the portable electronic device on the side of main body portion 2 of the external device and the portable electronic device on the side of the controller, communication may be maintained between the controller and the external device. Alternatively, a fixed IR transmitter, receiver may be provided on the controller or on main body portion 2 of the external device.

Figure 32:
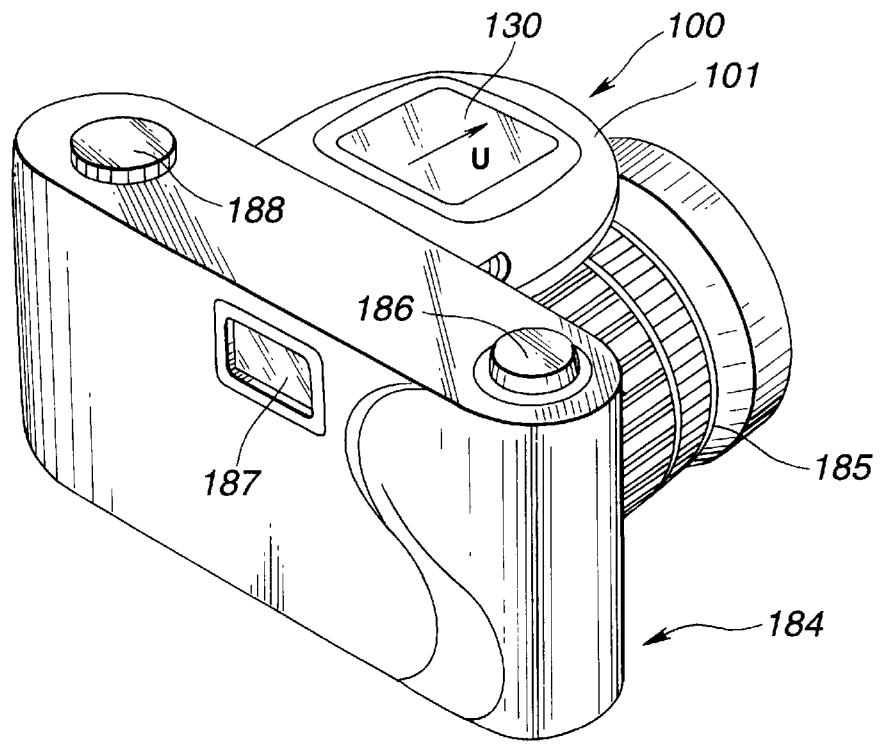
FIG. 32 depicts the insertion of a portable electronic apparatus into a digital camera in accordance with the invention.

In accordance with the invention, portable electronic device 100 may be connected to a still video camera 184 employing an imager, such as CCD, or a so-called digital camera by connector 150, as shown in FIG. 32. The still video camera includes a CCD for imaging and storing as electronic information a picture formed by an imaging lens 185. The still video camera is formed with a shutter button 186, a finder window 187 and an adjustment knob 188.

When coupled with the still video camera, the portable electronic device stores imaging data received therefrom in memory. The imaging data includes imaging date, time and place, data that makes up and defined the imaged object, light exposure volume data (shutter speed or light stop) and lens data. In addition to storing imaging data, the still video camera can also be operated to reproduce the same setting as the imaging data stored memory in the portable electronic device for a particular image.

Figure 33:
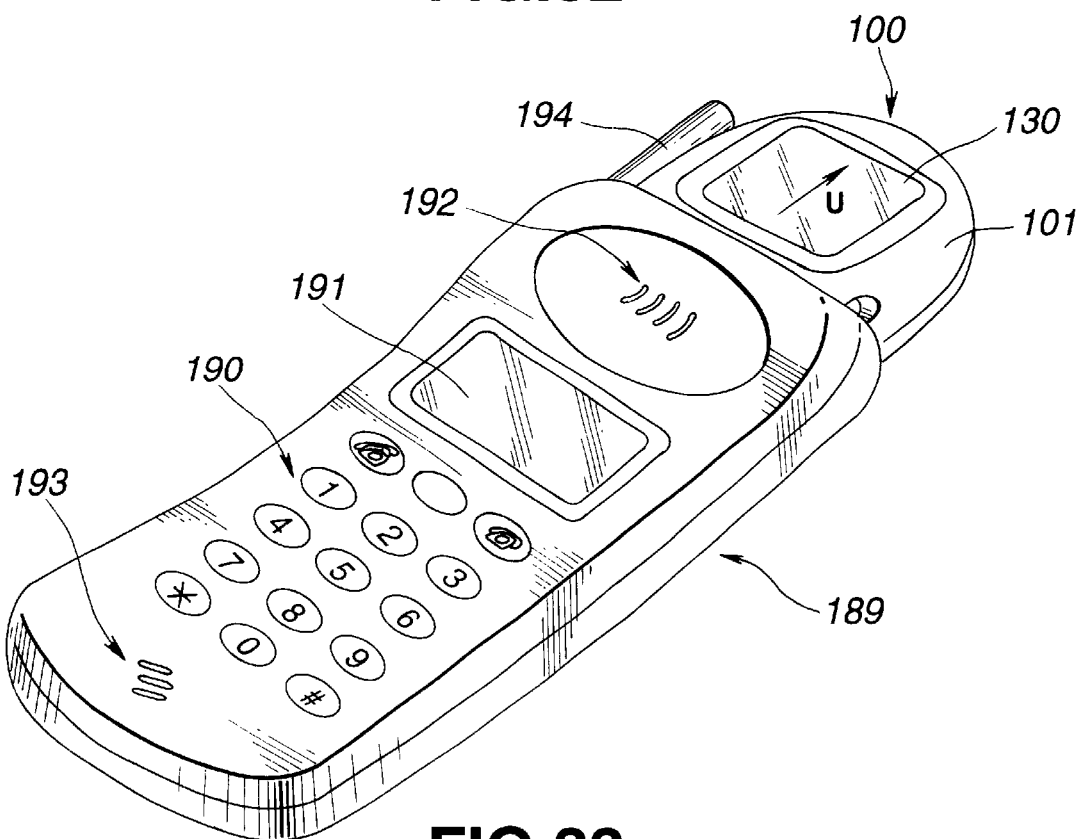
FIG. 33 depicts the insertion of a portable electronic apparatus into a portable communication device in accordance with the invention.
Figure 34A:
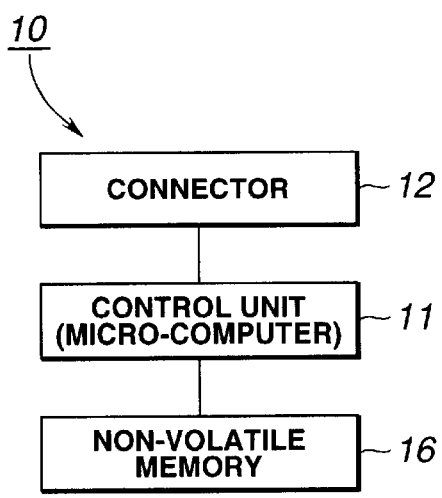
FIGS. 34A and 34B show an illustrative structure of internal portions of a conventional memory card device.
Figure 34B:
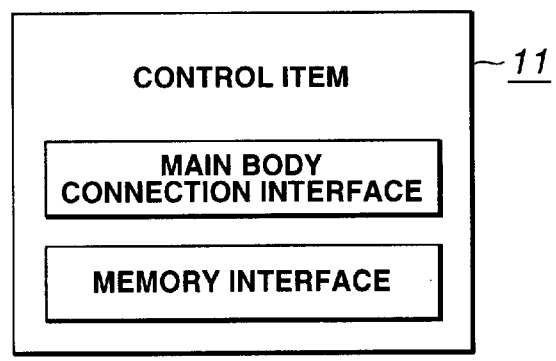
Figure 35:
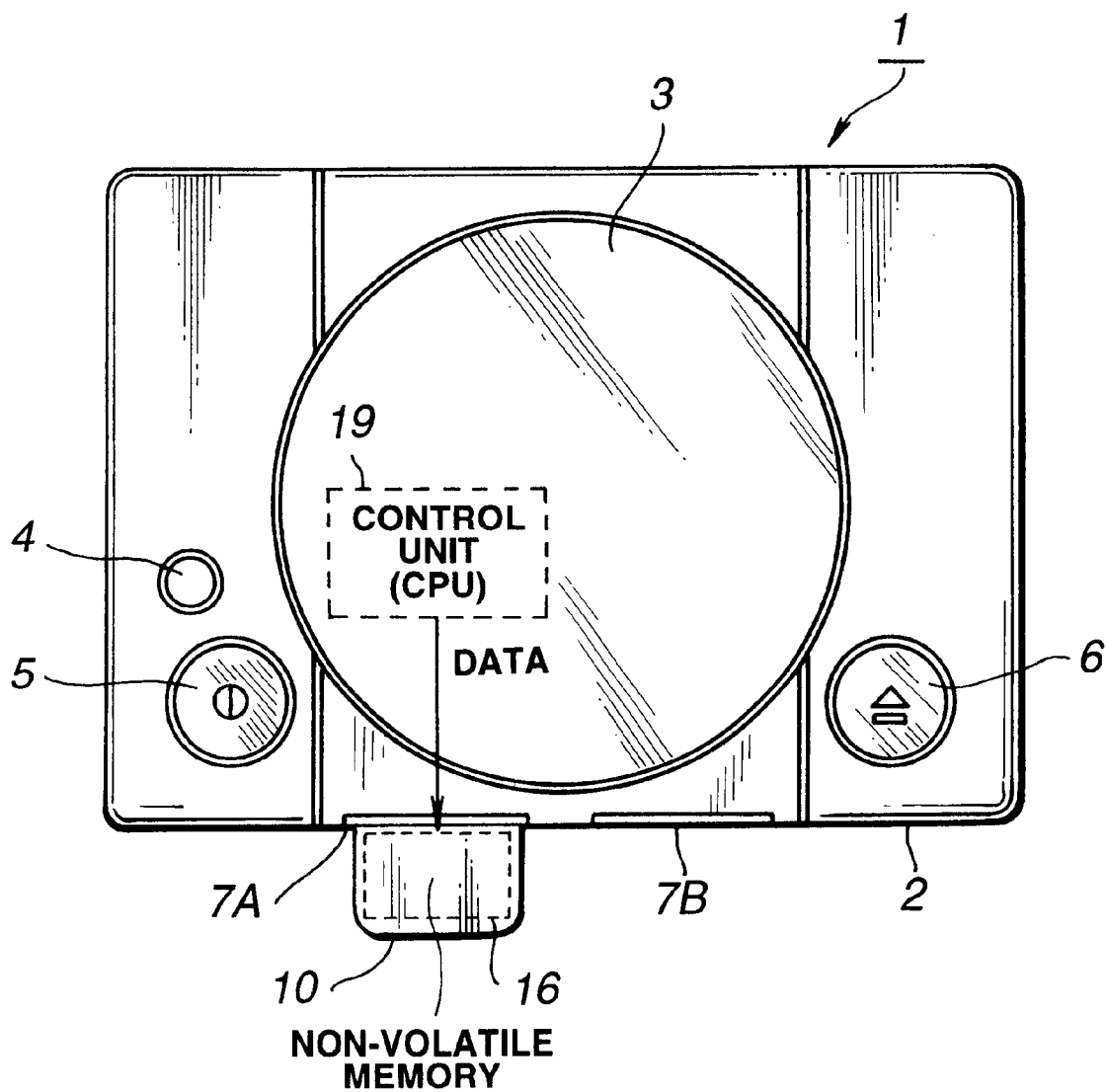
FIG. 35 depicts a conventional video game device employing a conventional memory card as an auxiliary storage device.

In accordance with the invention, portable electronic device 100 may also be connected to a portable communication device 189, such as a so-called portable telephone or personal handiphone system (PHS) via connector 150, as shown in FIG. 33. The portable communication device specifies a counterpart, receiver portable communication device 189 by a ten-key unit 190 to have wireless transmission/reception of information signals therewith over an antenna 194 via a telephone station or a relay station connected to the telephone station. The portable communication device is formed with a receiver 192, including a speaker, and a transmitter 193, including a microphone. The portable communication device also includes a display 191 for indicating input letters or digits by the ten-key unit and information indicative of the counterpart portable communication device that is acting as the counterpart receiving device.

If portable electronic device 100 is connected to portable communication device 189, game or other information stored in the portable electronic device can be exchanged with the counterpart portable communication device also coupled with a portable electronic device so that a so-called two player combat type game can be played between two players over the telephone network. Images associated with the game are displayed on display 130 of each portable electronic device 100. Information of many sorts stored in the portable electronic device in addition to game information can be transmitted/received over the telephone network, such as character marks or catch phrases stored in the portable electronic device that can be sent when communication between the two portable communication devices begins, such as for identifying the users.

Portable electronic device 100 can also store data such as name or telephone numbers, such as in an address book, for specifying a counterpart portable communication device, a variety of ID numbers, addresses and names. The portable communication device can then call or initiate a transmission based upon the information stored in the connected portable electronic device.

In accordance with the invention, a portable electronic device correctly display a picture on the display means without regard to the orientation of the portable electronic device relative to when mounted therein. Thus, the display or a portable electronic device may optionally display graphical information without regard to the orientation of the portable electronic device relative to the external equipment.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and in the accompanying drawings shall be interpreted as illustrative and not in a limiting sense.

It is also to be understood that the following claims are intended to cover all of the generic and specific features of the invention hereindescribed and all statements of the scope of the invention which, as a matter of language, might be said to fall therebetween.

What is claimed:

1. A portable electronic device adapted to be removably connected to an external device having a terminal block, comprising:
    a housing having an access opening therein;
    a display positioned within said housing, and for displaying display information;
    a switch provided in the access opening, facing to outside of the access opening, said switch being turned on when said switch is contacted with the terminal block of the external device, in the case where the terminal block is designed to contact with said switch and the terminal block is inserted in the access opening to contact with the switch;
    an electrical circuit accommodated in said housing and having a terminal adapted to be connected to the terminal block of said external device, said terminal being accessible via said access opening in said housing; and
    a lid member pivotally mounted to said housing for movement between a first position covering said terminal and said switch, and a second position exposing said terminal and said switch through said access opening, said terminal being adapted to be coupled with said external device via said access opening when said lid member is in said second position;
    wherein said electrical circuit determines a display orientation of said display information on said display based upon whether or not said switch is turned on.

2. The device according to claim 1, wherein said display information is displayed on said display in a first normal, upright orientation or in a second inverted, upside-down orientation, relative to said housing.

3. The device according to claim 2, wherein said display information is displayed in a third sideways, horizontal orientation, relative to said housing.

4. The device according to claim 3, wherein said electrical circuit determines whether said displayed information is to be displayed in any one of said first, second, and third orientations, relative to said housing.

5. The device according to claim 1, wherein said portable electronic device is adapted to be connected to said external device when said lid member is removed.

6. The device according to claim 1, said portable electronic apparatus further comprising at least one actuator for inputting information by a user.

7. The device according to claim 6, wherein said at least one actuator is supported on said lid member, said device further comprising:
    at least one switch element disposed in said housing and in registration with said at least one actuator,
    wherein a force applied to said at least one actuator when said lid member is in said first position is transferred via said at least one switch element.

8. The device according to claim 1, wherein said external device is a video game device.

9. A method for displaying display information on a display of a portable electronic device adapted to be removably connected to an external device having a terminal block, said portable electronic device comprising:
    a housing having an access opening;
    a display positioned within said housing, and for displaying display information;
    a switch provided in the access opening, facing to outside of the access opening, said switch being turned on when the switch is contacted with the terminal block of the external device, in the case where the terminal block is designed to contact with said switch and the terminal block is inserted in the access opening to contact with the switch;
    an electrical circuit accommodated in said housing and having a terminal adapted to be connected to said terminal block of the external device, said terminal being accessible via said access opening in said housing; and
    a lid member pivotally mounted to said housing for movement between a first position covering said terminal and said switch, and a second position exposing said terminal and said switch through said access opening, said terminal being adapted to be coupled with said external device via said access opening when said lid member is in said second position;
    said method comprising the steps of:
    determining whether or not the switch is turned on due to the insertion of the terminal block into the access opening;
    determining a display orientation of said display information on said display based on whether the switch is turned or not; and
    controlling the display of said display information on said display based on the determined display orientation.

10. The method according to claim 9, wherein said display information is displayed on said display in a first normal, upright orientation or in a second inverted, upside-down orientation relative to said housing.

11. The method according to claim 10, wherein said display information is displayed in a third sideways, horizontal orientation relative to said housing.

12. A portable electronic device adapted to be removably connected to an external device having a terminal block, comprising:
    a housing having an access opening therein;
    a display positioned within said housing, and for displaying display information; and an electrical circuit accommodated in said housing and having a terminal adapted to be connected to said external device, said terminal being accessible via said access opening in said housing; and a lid member pivotally mounted to said housing for movement between a first position covering said terminal and said switch, and a second position exposing said terminal and said switch through said access opening, said terminal being adapted to be coupled with said external device via said access opening when said lid member is in said second position;

wherein:

said electrical circuit transmitting an inquiry signal to said external device when said terminal is connected to said external device, receiving from said external device a response signal indicating a display orientation of said displayed information, and displaying said display information in the display orientation on said display based upon said response signal.

* * * * *